United States Patent
McPherson

(10) Patent No.: US 8,416,513 B1
(45) Date of Patent: Apr. 9, 2013

(54) BOOK HOLDING APPARATUS WITH A MAGNIFYING VISIBLE AREA

(76) Inventor: Bruce McPherson, Lake Mary, FL (US)

( * ) Notice: Subject to any disclaimer, the term of this patent is extended or adjusted under 35 U.S.C. 154(b) by 0 days.

(21) Appl. No.: 13/482,119

(22) Filed: May 29, 2012

Related U.S. Application Data

(60) Provisional application No. 61/594,518, filed on Feb. 3, 2012.

(51) Int. Cl.
*G02B 27/02* (2006.01)
*A47G 1/24* (2006.01)

(52) U.S. Cl. ........ 359/802; 359/801; 359/803; 359/742; 248/444; 248/446; 248/447; 248/454

(58) Field of Classification Search ................ 359/742, 359/798–805, 808; 348/240.99, 373, 836, 348/E5.024, E5.055; 248/444, 446, 447, 248/451, 454, 455, 457
See application file for complete search history.

(56) References Cited

U.S. PATENT DOCUMENTS

| | | | | |
|---|---|---|---|---|
| 4,688,861 A | * | 8/1987 | Culver | 312/223.5 |
| 4,726,556 A | * | 2/1988 | Weir | 248/454 |
| 4,739,960 A | * | 4/1988 | Adler | 248/453 |
| 4,921,343 A | * | 5/1990 | Ushiro et al. | 353/66 |
| 5,720,465 A | * | 2/1998 | Peltzer et al. | 248/453 |
| 6,015,129 A | * | 1/2000 | Harrigan | 248/444 |
| 6,044,758 A | * | 4/2000 | Drake | 100/43 |
| 6,106,123 A | * | 8/2000 | McDonald | 359/872 |
| 6,262,884 B1 | * | 7/2001 | Hwang et al. | 361/679.04 |
| 7,616,390 B1 | * | 11/2009 | Cosby | 359/801 |
| 8,259,222 B2 | * | 9/2012 | Rodriguez et al. | 348/373 |
| 2012/0176689 A1 | * | 7/2012 | Brown | 359/742 |

* cited by examiner

*Primary Examiner* — Loha Ben
(74) *Attorney, Agent, or Firm* — Sinorica, LLC

(57) ABSTRACT

A book holding apparatus with a magnifying visible area is configured with a bottom section, a left support arm, a right support arm, an upper section, a power supply plug, and a plurality of accessories. The bottom section is attached to the upper section by the left support arm and the right support arm. The upper section includes at least two light-emitting diode (LED) light strips and a fresnel lens. The power supply plug is electrically connected to the at least two LED light strips, and the at least two LED light strips provides the necessary illumination to the upper section. When the users place reading materials on the bottom section, they are able to see a magnified view of the reading materials through the fresnel lens, and the plurality of accessories provides additional functionality for the book holding apparatus with a magnifying visible area.

19 Claims, 27 Drawing Sheets

BOOK HOLDING APPARATUS WITH A MAGNIFYING VISIBLE AREA

The current application claims a priority to the U.S. Provisional Patent application Ser. No. 61/594,518 filed on Feb. 3, 2012.

FIELD OF THE INVENTION

The present invention relates generally to an apparatus for a holder. More specifically, the apparatus is a book holder that comprises a magnifying lens, a plurality of LED lights, and a reading support stand to allow a user to clearly read a book without the need of a his/her hands.

BACKGROUND OF THE INVENTION

A recent poll indicated that Americans dread blindness more than any other disability. The leading cause of blindness among white Americans is AMD (Age Related Macular Degeneration), and AMD is strongly associated with increasing age. As people get older, the risk of acquiring AMD increases simultaneously. It is important to mention that no one becomes completely blind from AMD, since some peripheral vision remains. But, the important central vision is lost. People over the age of 65 are at a 23% risk and the risk increases to nearly 40% over age 74. The 2010 American census indicates a population of 308,000,000 residents and it is increasing by about 10% annually. Studies indicate that by the year 2025, the population of people in the United States is numbered six times higher than in 1990. As a higher percentage of people reach age 60, AMD becomes a more serious medical issue for many elder people. Dr. Carl Kupfer publicly stated that 15 million Americans have signs of AMD. The prevalence is expected to rise to 21 million as the baby boomers age. At these rates, the incidence of AMD is expected to soon take on the aspects of an epidemic.

AMD is a little understood disease. It is a chronic condition that is the leading cause of vision loss in Americans age 40 and older. Many people are not aware of this incurable life-changing affliction. It causes no pain and often advances so slowly that many people notice little change in their vision until they become afflicted, and sometimes people can be suddenly afflicted. Women appear to be more at risk than men, and white Americans are much more likely to lose vision from AMD than African Americans. There is no known cure for the affliction but stem cell research could hold promise. However, application of current research is probably five years or more away. By 2020 the number of people having AMD is expected to increase significantly. AMD is a single disease which occurs when the macula, the central portion of the retina that is important for reading and color vision, is damaged, and there are two forms of AMD, Dry & Wet.

Dry AMD: The dry form is more common. More people with intermediate and advanced AMD combined have the dry form. An early sign is usually blurred vision. As the loss of light sensing cells becomes greater, victims see a small, but growing, blind spot in the center of their vision, and there is no FDA (Food and Drug Administration) approved treatment that exists for dry AMD.

Wet AMD: The early sign is that straight line vision appears irregular. This is a result of small blood vessels leaking fluid which lifts the macula, distorting vision. Early symptoms can be a serious warning with no remedy currently known to cure wet AMD. "LUCENTIS" is one of the medicines that have been approved as a treatment by the FDA for wet AMD at a cost of approximately $2000 per injection. "AVASTON" is another medicine which has not been approved by the FDA for use in the eye, but is being used off-label, at about $50 per injection. An average of eight injections into the eye is required annually for either treatment.

Low vision presents a multitude of problems and reading small print is one of them. Some low-vision devices are available to help with mobility and visual tasks. These low-vision devices all fail to adequately illuminate small print material or other materials that a user wants to read while also holding the material in a comfortable and easy-to-see manner. Currently, there are no effective apparatus that can assist a user who has AMD and allow him/her to perform personal activities such as reading a book or writing without having to hold the book for an extended period of time. It is therefore an object of the present invention to introduce an apparatus for book holder that comprises a magnifying lens, a plurality of LED lights, and a reading support stand to allow a user to clearly read a book without the need a his/her hands.

DETAILED DESCRIPTIONS OF THE INVENTION

All illustrations of the drawings are for the purpose of describing selected versions of the present invention and are not intended to limit the scope of the present invention.

The present invention is an apparatus for a book holder that comprises a magnifying lens, a plurality of lighting devices, and a reading support stand to allow a user to clearly read a book, letter, magazine, or any other desired material without the need a his/her hands. The present invention can also be used for writing documents, sketching, or similar personal activities. The following comprises potential users of the present invention:

Currently, any one of 15,000,000+ individuals in the U.S. private sector

Similar numbers in foreign countries and the numbers grow as age progresses

Public and private libraries

Civilian hospitals or Veterans hospitals

Senior homes.

The present invention is developed to assist people who have visual problems which interfere with their ability to read or to perform other personal activities. The causes may be due to eye ailments that affects the visual system, such as macular degeneration, or muscle/nerve ailments that can discourage holding articles, such as books or magazines, for an extended time period.

The present invention is designed into a compact, affordable and elegant device. The unique design provides comfort and convenience not usually experienced by the visually impaired patients. The present invention provides the user with a number of comfortable reading positions, whether in an easy chair or in the bed room. The present invention can also be placed on an appropriate lap-pillow, a dedicated stand, or a table, so that the present invention can be used in sitting position or standing position. When the present invention is used while the user is lying on a bed, a serving tray or an overhanging hospital type bed tray can be used. Users also find the present invention to be uncomplicated. The present invention is versatile, allowing most functions to be performed without the use of complicated electronic devices or additional attachments. The present invention incorporates adjustments so that the users can select the best comfortable reading position and several hands-free methods for holding different reading materials. The careful design of the present invention provides a durable product that resists damage from most accidental mistreatment. In the preferred embodiment, the present invention comprises a storage package, measuring preferably 2¾"×13½"×13 ½", requires limited space when not in use and provides convenient storage. The present invention is easily portable apparatus and preferably weighs less than 3 pounds. The present invention is a self contained apparatus and can be relocated in the assembled or disassembled condition.

Figure 1:
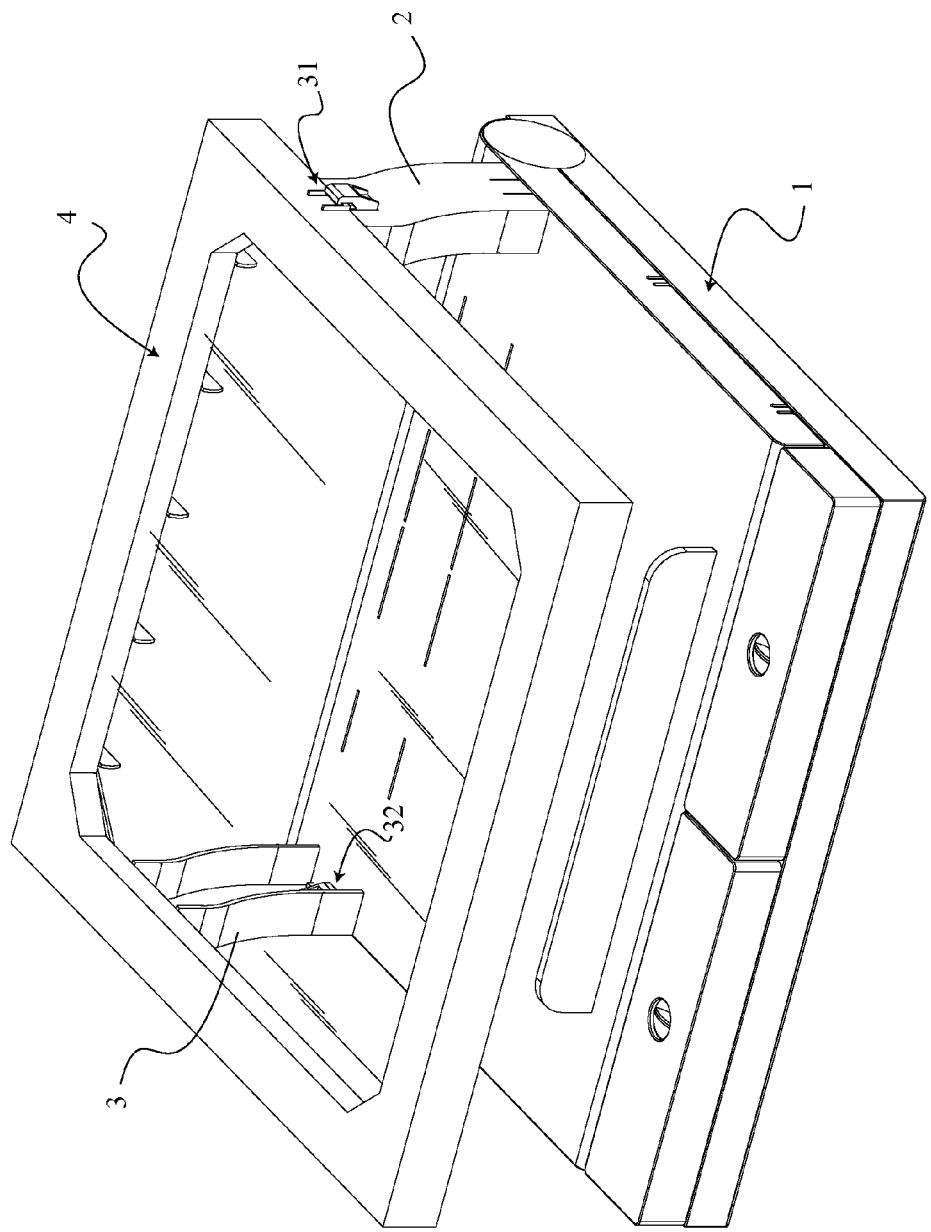
FIG. 1 is a perspective view of the present invention without the plurality of accessories.
Figure 4:
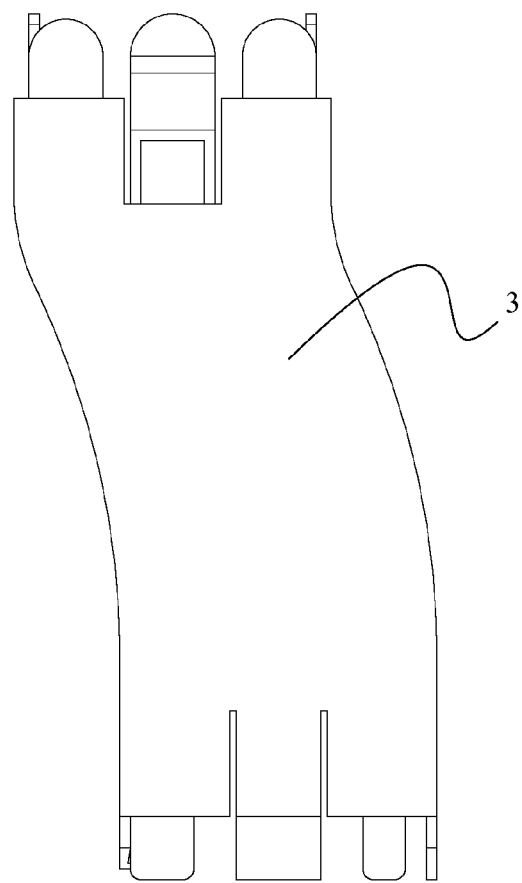
FIG. 4 is a front view of the right support arm.
Figure 5:
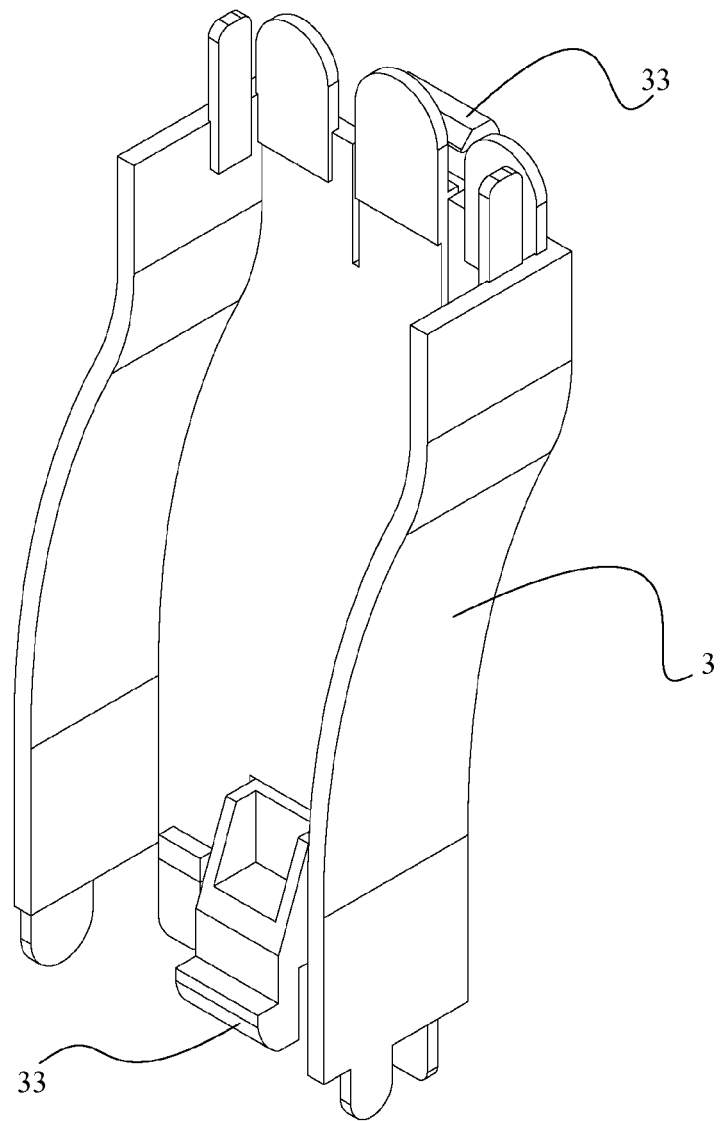
FIG. 5 is a perspective view of the right support arm.
Figure 6:
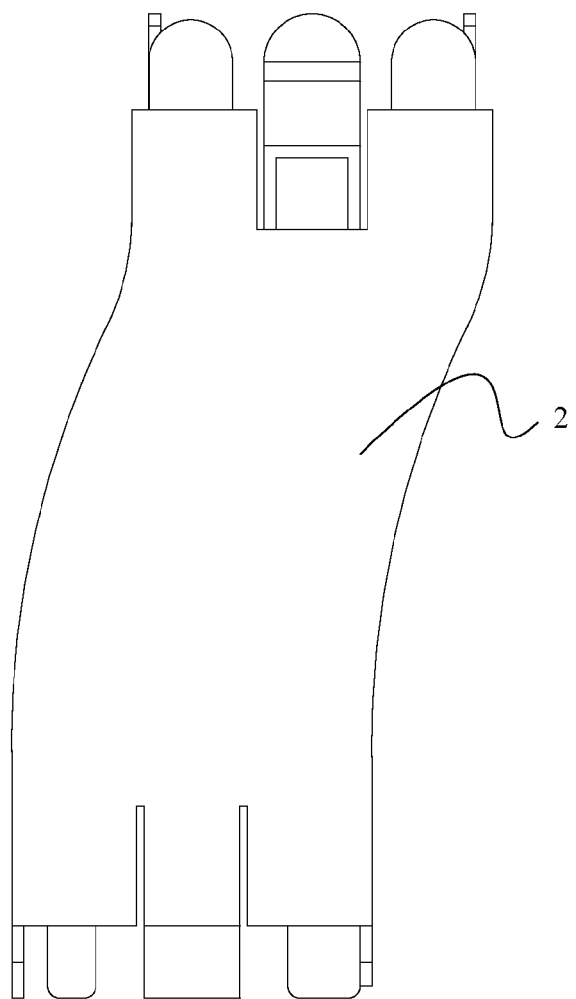
FIG. 6 is a front view of the left support arm.
Figure 7:
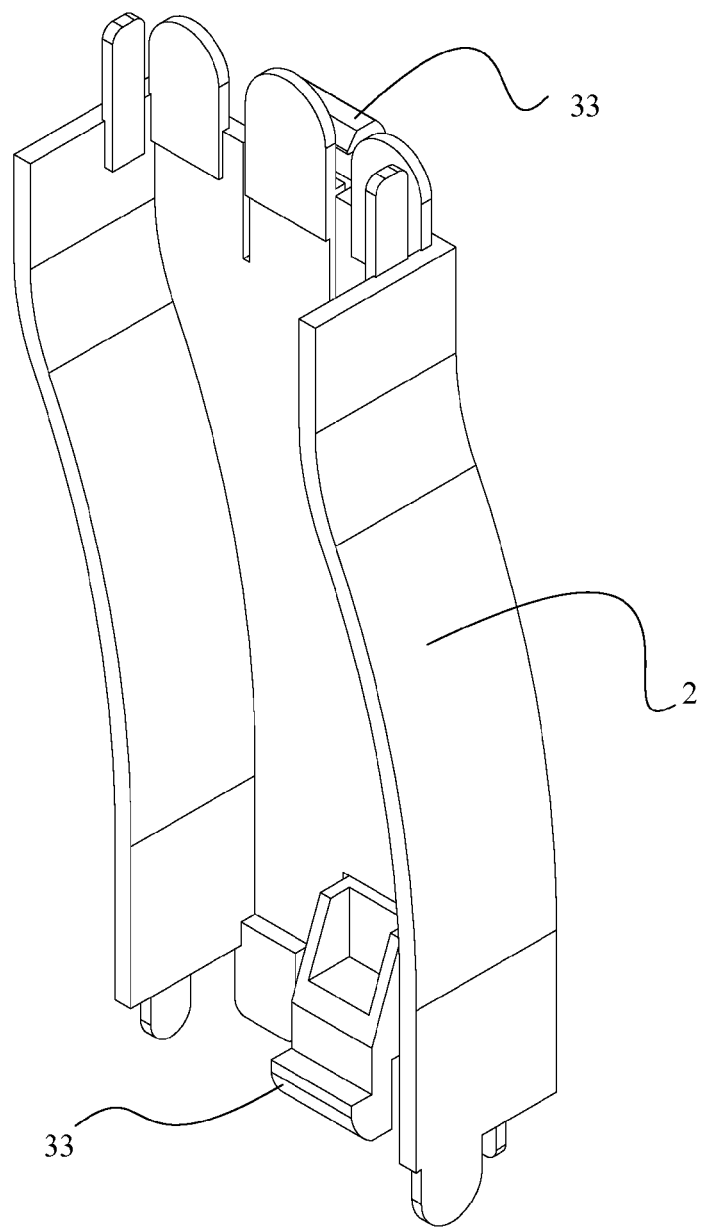
FIG. 7 is a perspective view of the left support arm.

In reference to FIG. 1, FIG. 4, and FIG. 6, the present invention comprises a bottom section 1, a left support arm 2, a right support arm 3, an upper section 4, a power supply plug 5, and a plurality of accessories 6, allowing simple assembly procedures between the components. These parts have been designed to be light weight, relatively small, easy to handle, simple to store, and to allow the reader to conveniently disassemble the device into a compact size. Because of the compact size, the present invention can be easily transported to remote locations. When completely assembled, the present invention retains its compact configuration with no additional paraphernalia, such as support struts. The assembly procedures and tools are minimum in the present invention, but can be slightly differed in different embodiments. The left support arm 2 and the right support arm 3 each comprise a top locking system 31 and a bottom locking system 32. The top locking system 31 and the bottom locking system 32 are oppositely positioned on the top half and bottom half of the left support arm 2 and the right support arm 3. The left support arm 2 and the right support arm 3 are engaged with the bottom section 1 by the bottom locking system 32 and the left support arm 2 and the right support arm 3 are engaged with the upper section 4 by the top locking system 31. The design incorporates an overhanging configuration for the upper section 4 which allows open space for the reading material to be positioned or rearranged on the bottom section 1. In the preferred embodiment, a snap fit lock system is used in the top locking system 31 and the bottom locking system 32, but the top locking system 31 and the bottom locking system 32 are not only limited to the snap fit lock system. For example, a male/female clip system, a screw attachment system, a nuts and bolts attachment system, or any other type of disassemble lock system can be used as the top locking system 31 and the bottom locking system 32. In reference to FIG. 5, FIG. 7, and FIG. 9, the top locking system 31 and the bottom locking system 32 each comprises a cantilever snap fit hook 33 and a snap fit hook opening 34. The cantilever snap fit hook 33 is flexibly connected with the left support arm and the right support arm. The cantilever snap fit hook 33 in the top locking system 31 is connected to the left support arm 2 and the right support arm 3 from outside, and the cantilever snap fit hook 33 in the bottom locking system 32 is connected to the left support arm 2 and the right support arm 3 from inside. In the preferred embodiment, two snap fit hook openings 34 are oppositely positioned on the bottom section 1 and the upper section 4. The cantilever snap fit hook 33 in the left support arm 2 and the right support arm 3 locks with the bottom section 1 and the upper section 4 as it engages with the snap fit hook opening 34.

Figure 2:
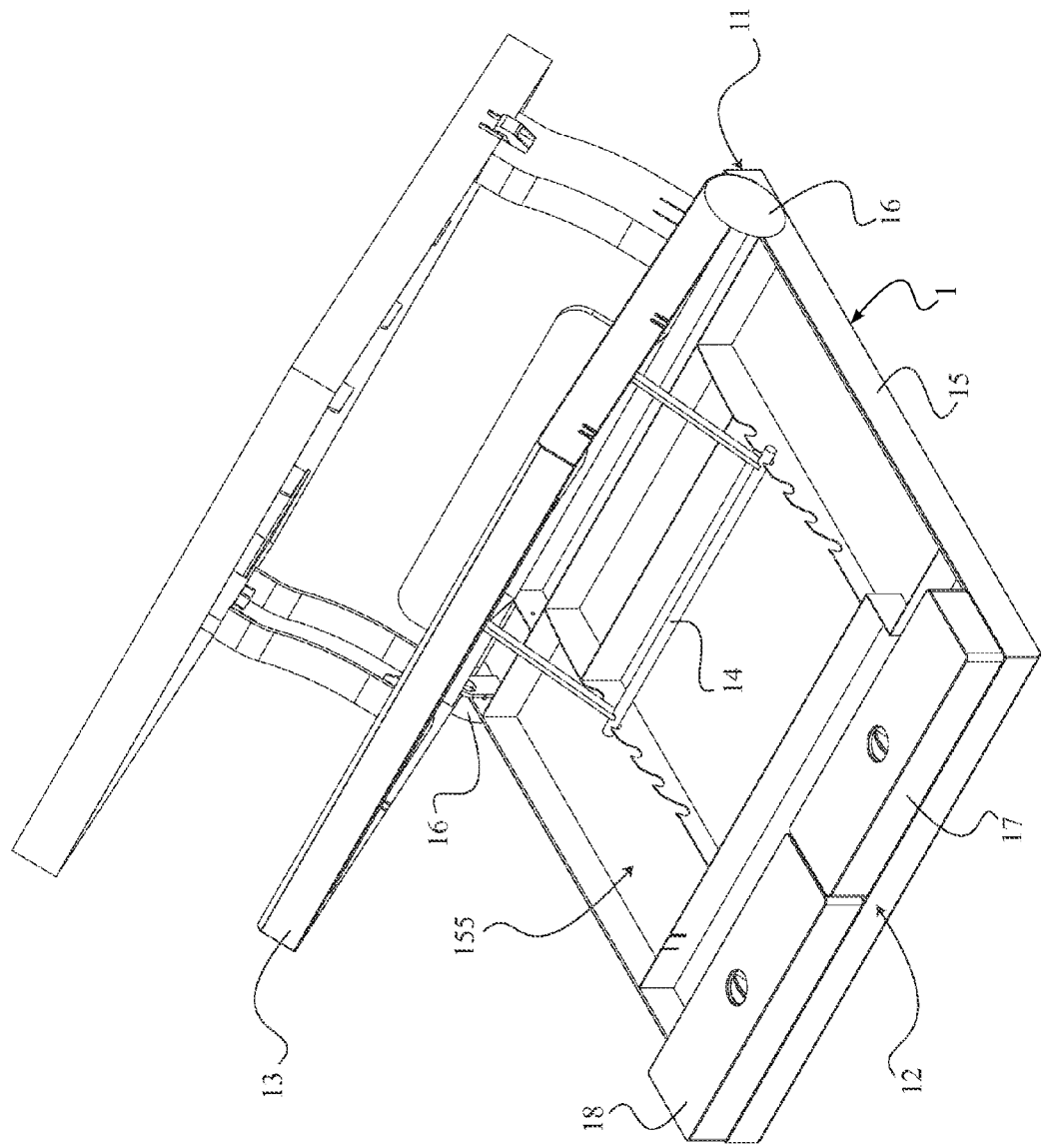
FIG. 2 is a perspective view of the present invention showing the opened bottom section without the plurality of accessories.
Figure 3:
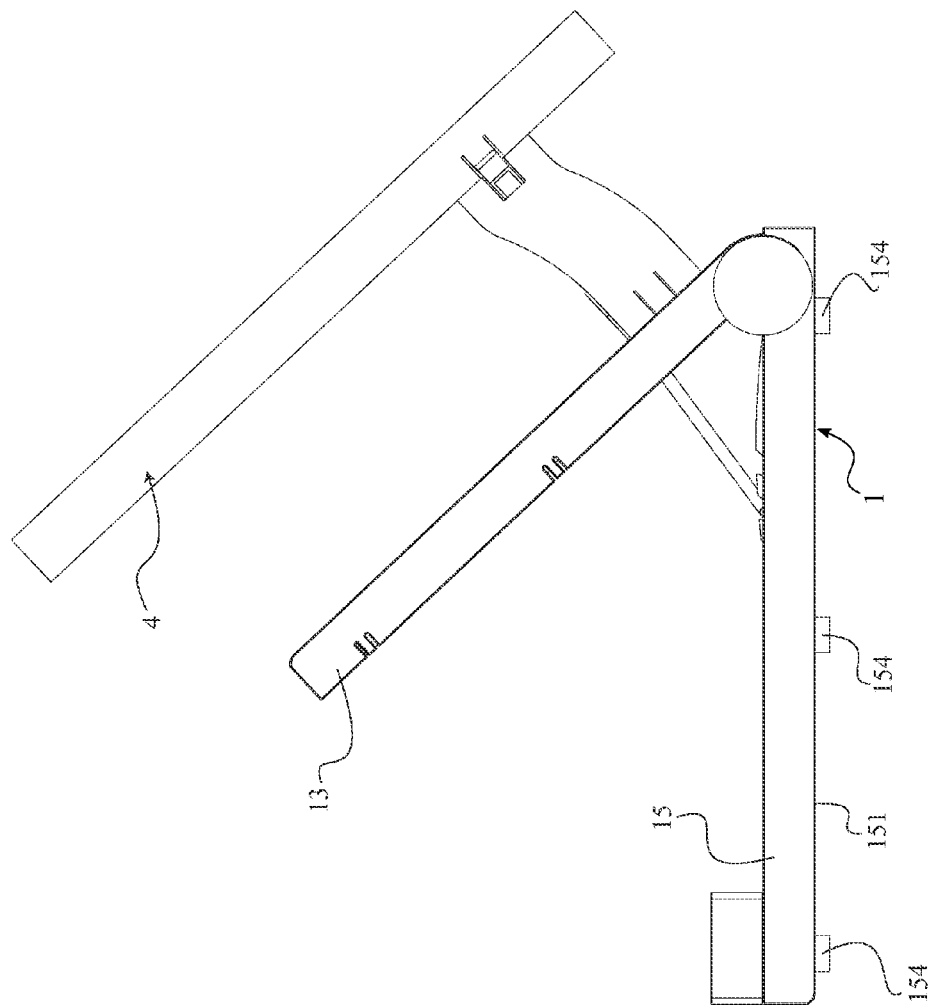
FIG. 3 is left side view of the present invention showing the opened bottom section without the plurality of accessories.
Figure 8:
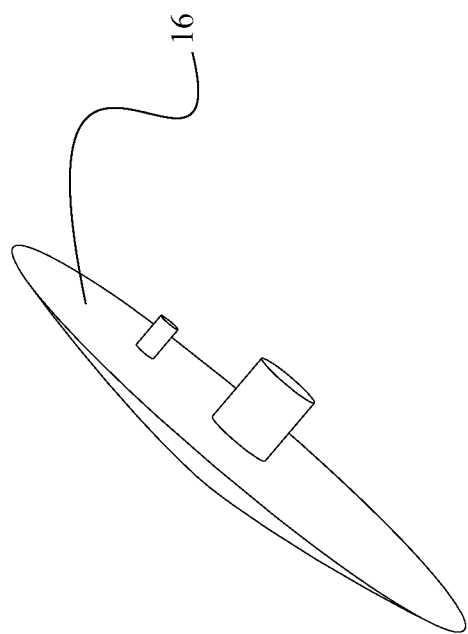
FIG. 8 is a back perspective view of the hinge pin.

In reference to FIG. 2 and FIG. 3, the bottom section 1 comprises a back end 11, a front end 12, a cover top 13, a web 14, a base pan 15, at least two hinge pins 16, a left storage cover 17, and a right storage cover 18. The bottom section functions as the reading support stand, and each component in the bottom section 1 can be washed with dish washing soap and rinsed in water when required. The design of the present invention has eliminated pointed or sharp surfaces that might prove dangerous during the cleaning process. The cover top 13 is positioned above the base pan 15. The at least two hinge pins 16 are respectively positioned on the left side and the right side of the base pan 15 and the cover top 13 from the back end 11. In reference to FIG. 8, each of the at least two hinge pins 16 comprises a cylindrical portion, an extruded lock cylinder, and a cap portion. The cylindrical portion is concentrically connected to the cap portion, and the extruded lock cylinder is also connected to the cap portion but positioned adjacent with the cylindrical portion. The cylindrical portions of the at least two hinge pins 16 are traversed into concentrically positioned connecting openings of the base pan 15 and the cover top 13 connecting the base pan 15 with the cover top 13. The at least two hinge pins 16 lock in place with the base pan 15 when the extruded lock cylinder is traversed into a lock pin cavity. Since the at least two hinge pins 16 are locked with the base pan 15 due to the lock pin cavity, the at least two hinge pins 16 movably connect the base pan 15 with the cover top 13 from the back end 11 while allowing the cover top 13 to open from the front end 12.

Figure 9:
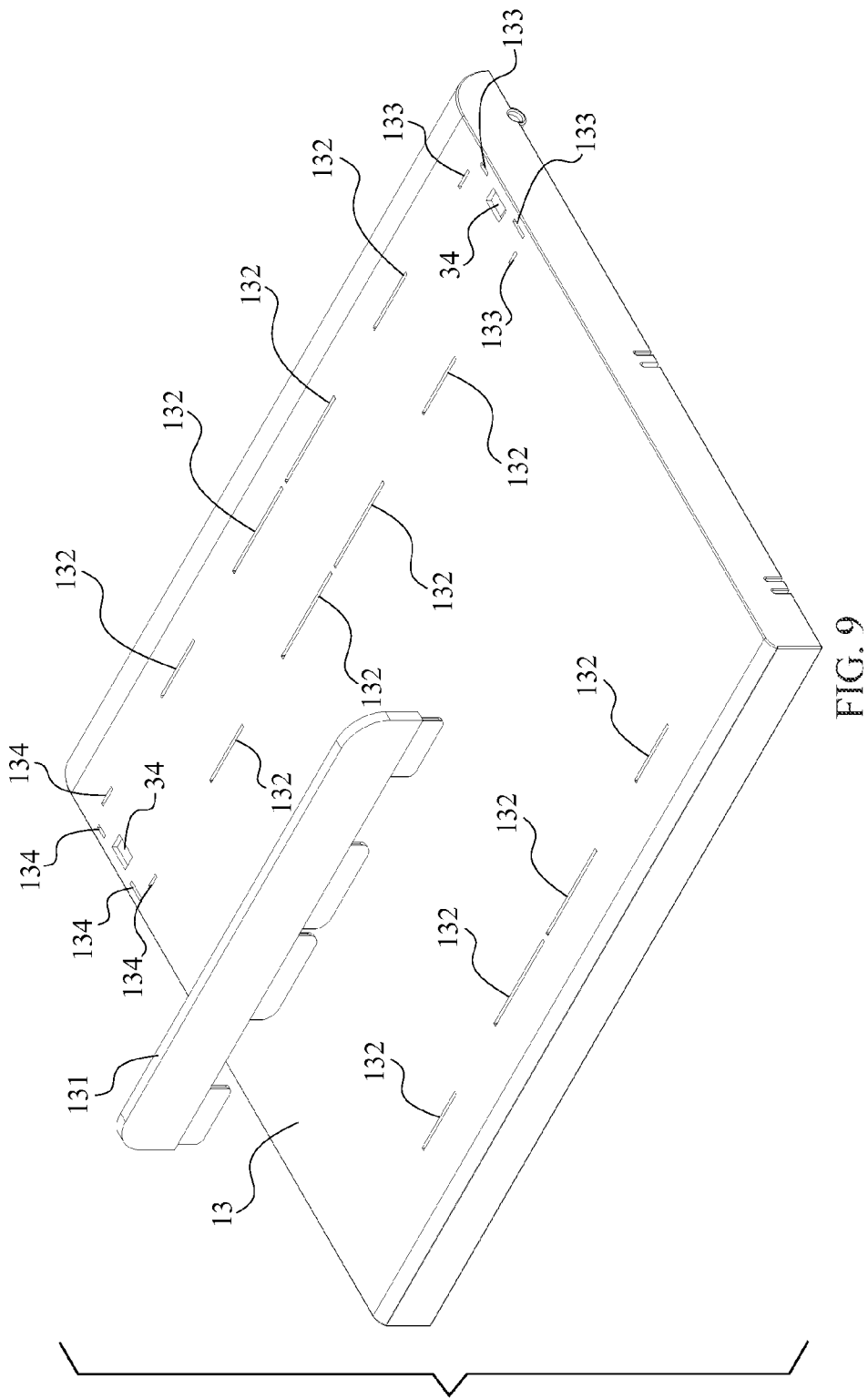
FIG. 9 is a perspective view of the cover top.
Figure 12:
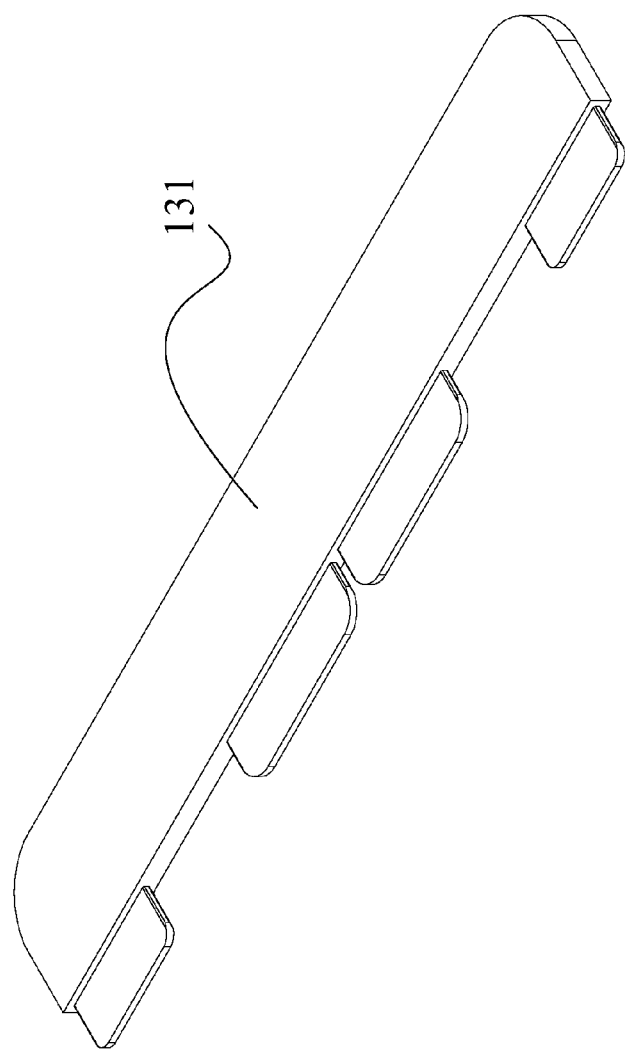
FIG. 12 is a perspective view of the media rest.

In reference to FIG. 9 and FIG. 12, the cover top 13 comprises a media rest 131, a plurality of connection openings 132, left support recesses 133, right support recesses 134, and the two snap fit hook openings 34. The cover top 13 is textured so that the cover top 13 subdues the reflected light from the plurality of lighting devices. The plurality of connection openings 132 is positioned on the cover top 13, and the plurality of connection openings 132 horizontally extends from the left side to the right side of the cover top 13. The media rest 131 is attached to cover top 13 through the plurality of connection openings 132 from above. The preferred embodiment comprises three lines of plurality of connection openings 132. First and second lines of the plurality of connection openings 132 are positioned on the back end 11, and the third line of the plurality of connection openings 132 is positioned on the front end 12. The media rest 131 is used as a barrier to hold books or other material in place with the cover top 13 so that the books or other material don't slide down the cover top 13. The left support recesses 133 and the right support recesses 134 are positioned on the cover top 13 from the back end 11. The left support arm 2 and the right support arm 3 are respectively inserted into the left support recesses 133 and the right support recesses 134 as the bottom locking system 32 locks the left support arm 2 and the right support arm 3 with the cover top 13. When the left support arm 2 and the right support arm 3 engage with the cover top 13, the cantilever snap fit hook 33 in the bottom locking system 32 engages with the snap fit hook opening 34 on the cover top. The two snap fit hook openings 34 are adjacently positioned with the left support recesses 133 and the right support recesses 134.

Figure 10:
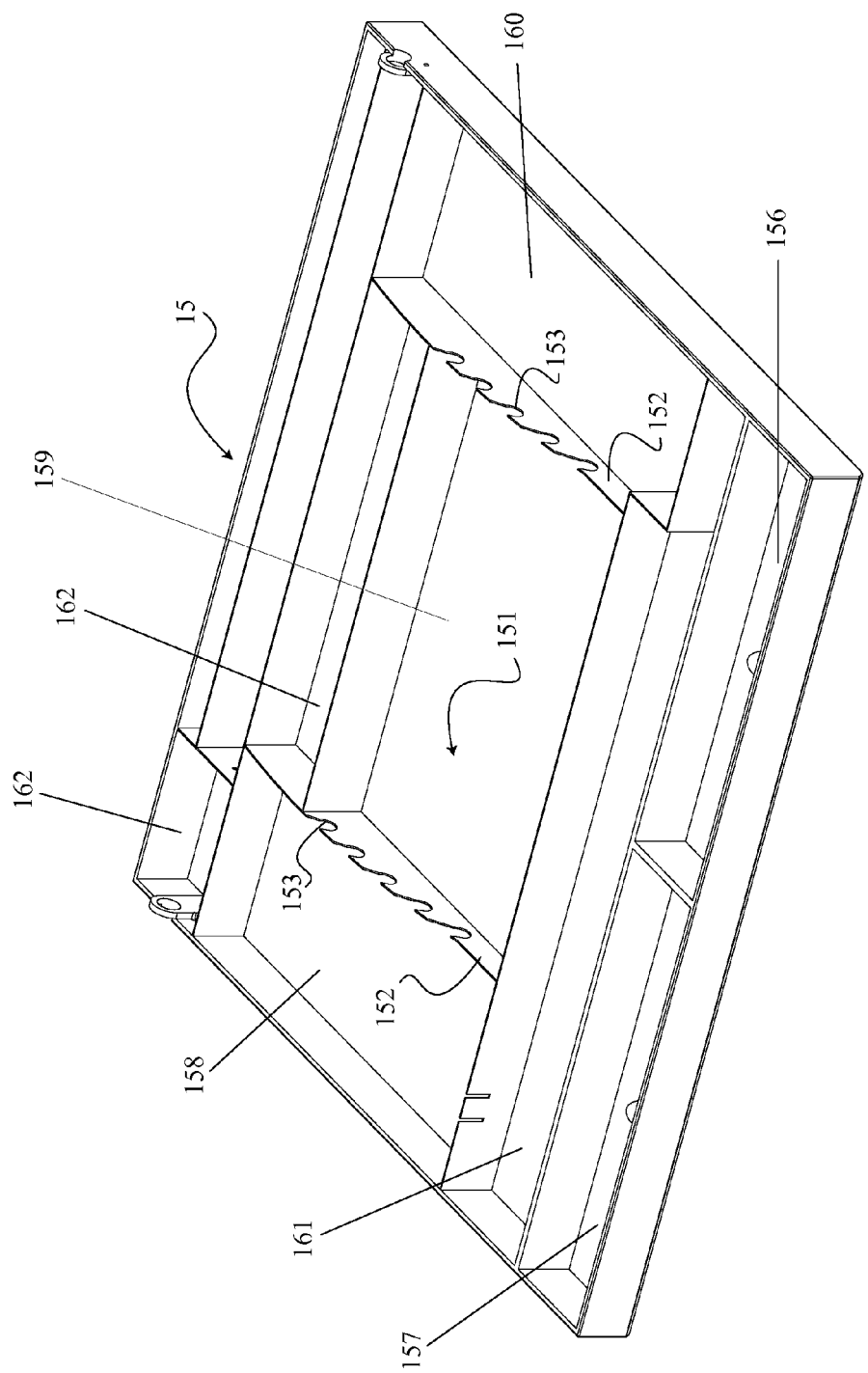
FIG. 10 is a perspective view of the base pan.

In reference to FIG. 10, the base pan 15 comprises a bottom base panel 151, at least two parallel ramps 152, a plurality of resilient rest pads 154, and a plurality of storage compartments 155. The bottom base panel 151 is positioned on the bottom edge of the base pan 15. The at least two parallel ramps 152 perpendicularly positions between the front end 12 and back end 11. The at least two parallel ramps 152 comprise at least five pairs of recesses 153. The at least five pairs of recesses 153 are positioned along the at least two parallel ramps 152. The plurality of resilient rest pads 154 is connected to the bottom side of the bottom base panel 151. The plurality of resilient rest pads 154 provides friction between the present invention and different surfaces so that the present invention can be safely positioned on any kind of surface. The plurality of resilient rest pads 154 can be made from soft rubber pads or any other related material which provides friction between multiple surfaces.

Figure 13:
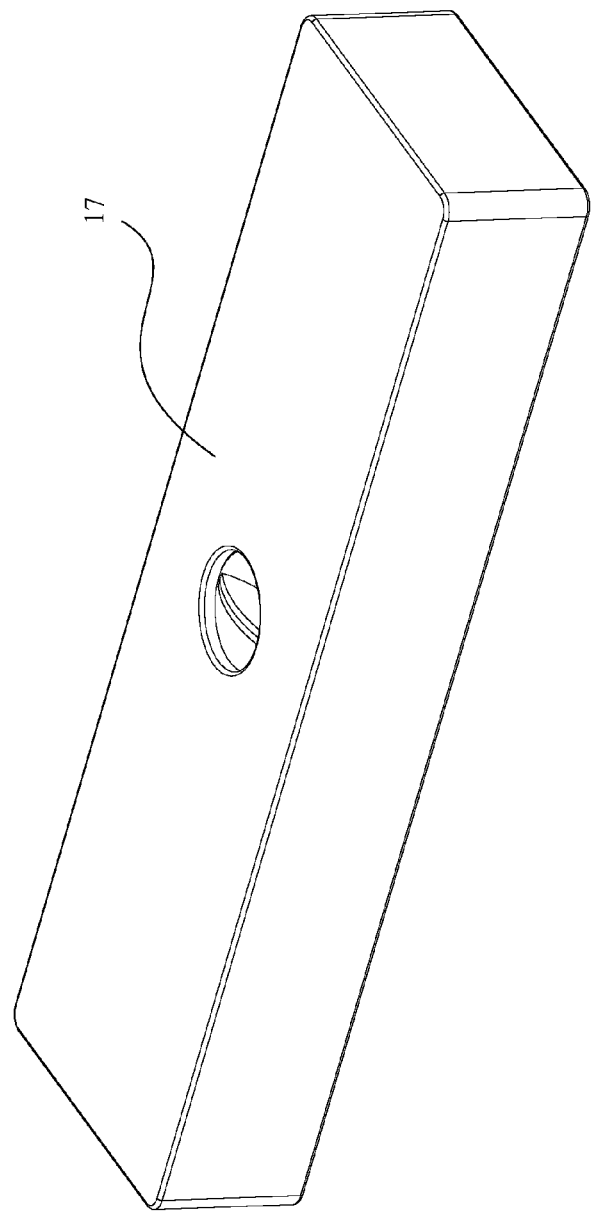
FIG. 13 is a perspective view of the left storage cover.
Figure 14:
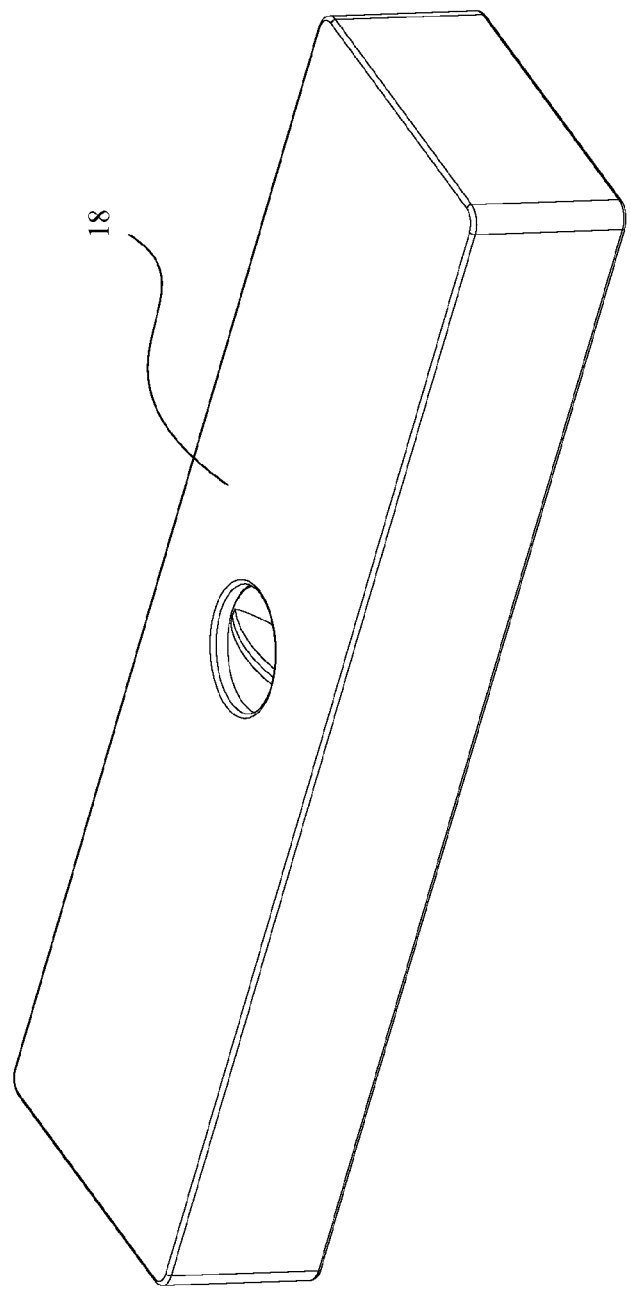
FIG. 14 is a perspective view of the right storage cover

In reference to FIG. 10, the plurality of storage compartments 155 is positioned within the base pan 15 and comprises a left compartment 156, a right compartment 157, a clip compartment 158, a band compartment 159, a support arm compartment 160, a power plug compartment 161, and additional compartments 162. The left compartment 156 and the right compartment 157 are adjacently positioned with the front end 12. The left storage cover 17 is attached to the left compartment 156 so that the left compartment 156 can be covered. Similarly, the right storage cover 18 is attached to the right compartment 157 so that the right compartment 157 can be covered. In reference to FIG. 13 and FIG. 14, the left storage cover 17 and the right storage cover 18 each comprises a twist lock knob. The twist lock knob engages with a lock knob cavity in the left compartment 156 and the right compartment 157 upon the clockwise direction and disengages upon the counterclockwise direction. The left compartment 156 and the right compartment 157 provide extra storage within the present invention so that the users can store their personal belongs. The power plug compartment 161 is positioned behind the left compartment 156 and the right compartment 157. The power plug compartment 161 stores the power supply plug 5. Since the power plug compartment 161 comprises at least two terminal openings, terminals of the power supply plug 5 can be neatly inserted into the at least two terminal openings which allow secure placement of the power supply plug 5 within the power plug compartment 161. The clip compartment 158, the support arm compartment 160, and the band compartment 159 are positioned behind the power plug compartment 161. The clip compartment 158 is adjacently located behind the right compartment 157 and the support arm compartment 160 is adjacently located behind the left compartment 156. The band compartment 159 is located in between the clip compartment 158 and the support arm compartment 160. The additional compartments 162 are positioned behind the band compartment 159. Small personal items such as reading glasses, pens, pencils, and any other desired small object can be stored in the additional compartments 162.

Figure 11:
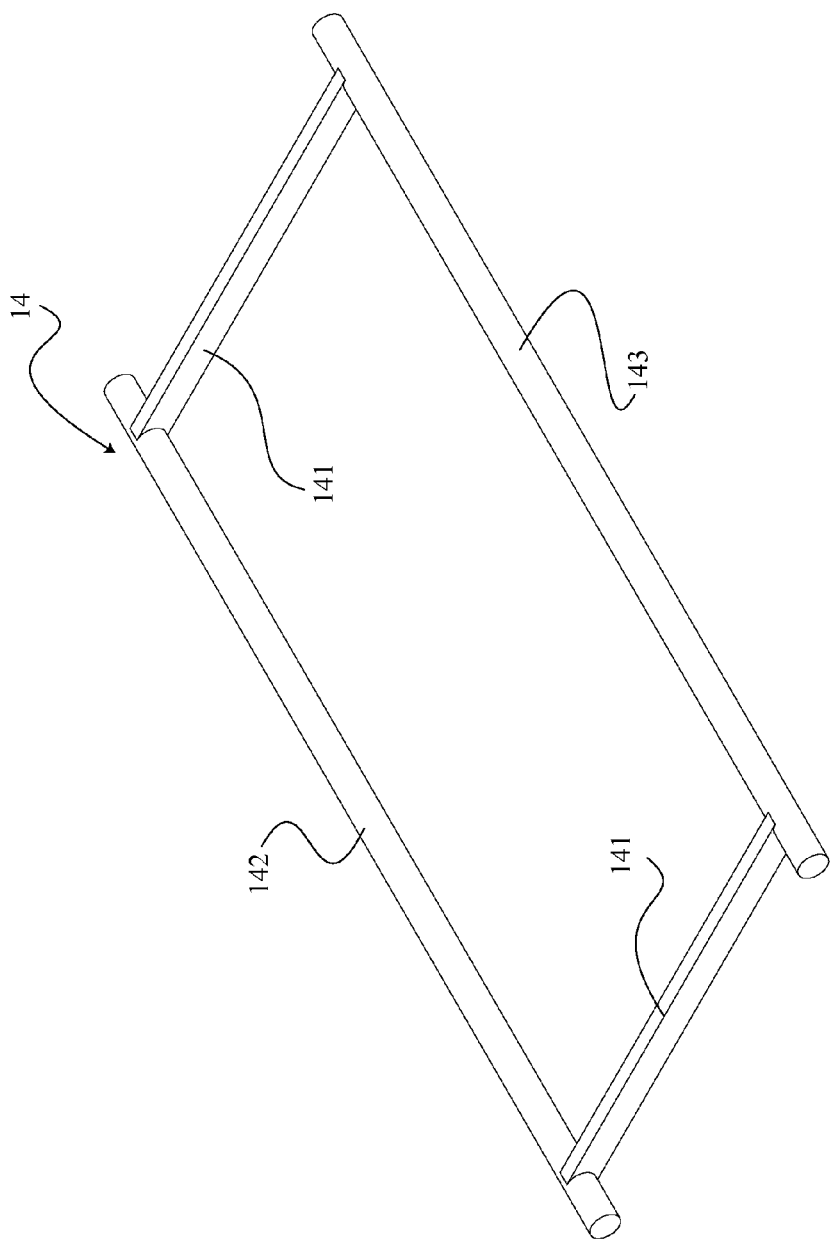
FIG. 11 is a perspective view of the web.

In reference to FIG. 11, the web 14 comprises at least two vertical rods 141, a top horizontal rod 142, and a bottom horizontal rod 143. The at least two vertical rods 141 are perpendicularly connected with the top horizontal rod 142 and the bottom horizontal rod 143 creating a rectangular shape. The top horizontal rod 142 is movably connected to the cover top 13. Since the top horizontal rod 142 is movable within the cover top 13, the bottom horizontal rod 143 can be placed in one of the at least five pairs of recesses 153. When the bottom horizontal bar is placed within one of the at least five pairs of recesses 153, the cover top 13 is positioned in an angled position which is also known as a favorable reading angle. Since the at least five pairs of recesses 153 are placed in different positions along the at least two parallel ramps 152, each of the at least five pairs of recesses 153 creates different favorable reading positions. In the preferred embodiment, the at least five pairs of recesses 153 create five different favorable reading positions, such as 30 degrees, 37 degrees, 45 degrees, 53 degrees, and 60 degrees. In different embodiments, any desired degree of angle for the favorable reading positions may be used. The five different favorable reading positions allow the user to select a suitable physical position for comfortable viewing to read. The web 14 can be folded against the cover top 13 when the users do not need to create the favorable reading angle or when the present invention is stored away.

Figure 16:
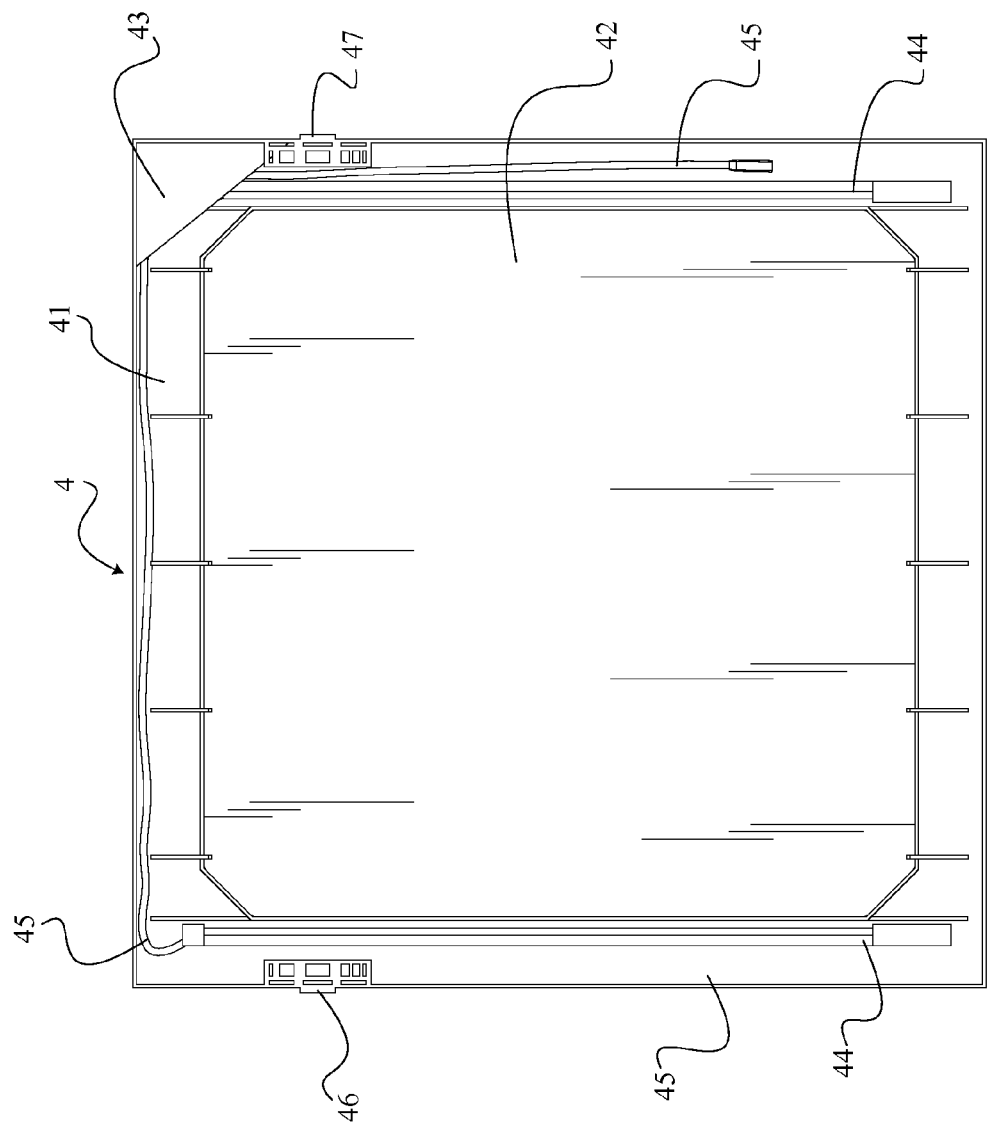
FIG. 16 is a bottom view of the upper section.

In reference to FIG. 16, the upper section 4 comprises a lens holder 41, a fresnel lens 42, a harness cover 43, at least two light-emitting diode (LED) light strips 44, a wire harness 45, a left riser receptacle 46, and a right riser receptacle 47. The lens holder 41 has a rectangular shape frame, and the fresnel lens 42 is centrally connected to the lens holder 41 from inside by allowing the fresnel lens 42 to be deformed within the safe limit of the material and installed under the lens holder's 41 molded-in retainer surfaces. Even though the fresnel lens 42 is used as the magnifying lens in the preferred embodiment, any type of magnifying lens can be used instead of the fresnel lens 42. In the preferred embodiment, a full page 2× fresnel lens 42, which views a reading area of 9"×11" without a television monitor or an electronic reader, is used so that fresnel lens 42 provides a clear and crisp enlarged image to the users. Depending on the user application, the lens holder 41 can be arranged to provide a 9" horizontal×11" vertical lens or a 11" horizontal×9" vertical orientation.

Figure 26:
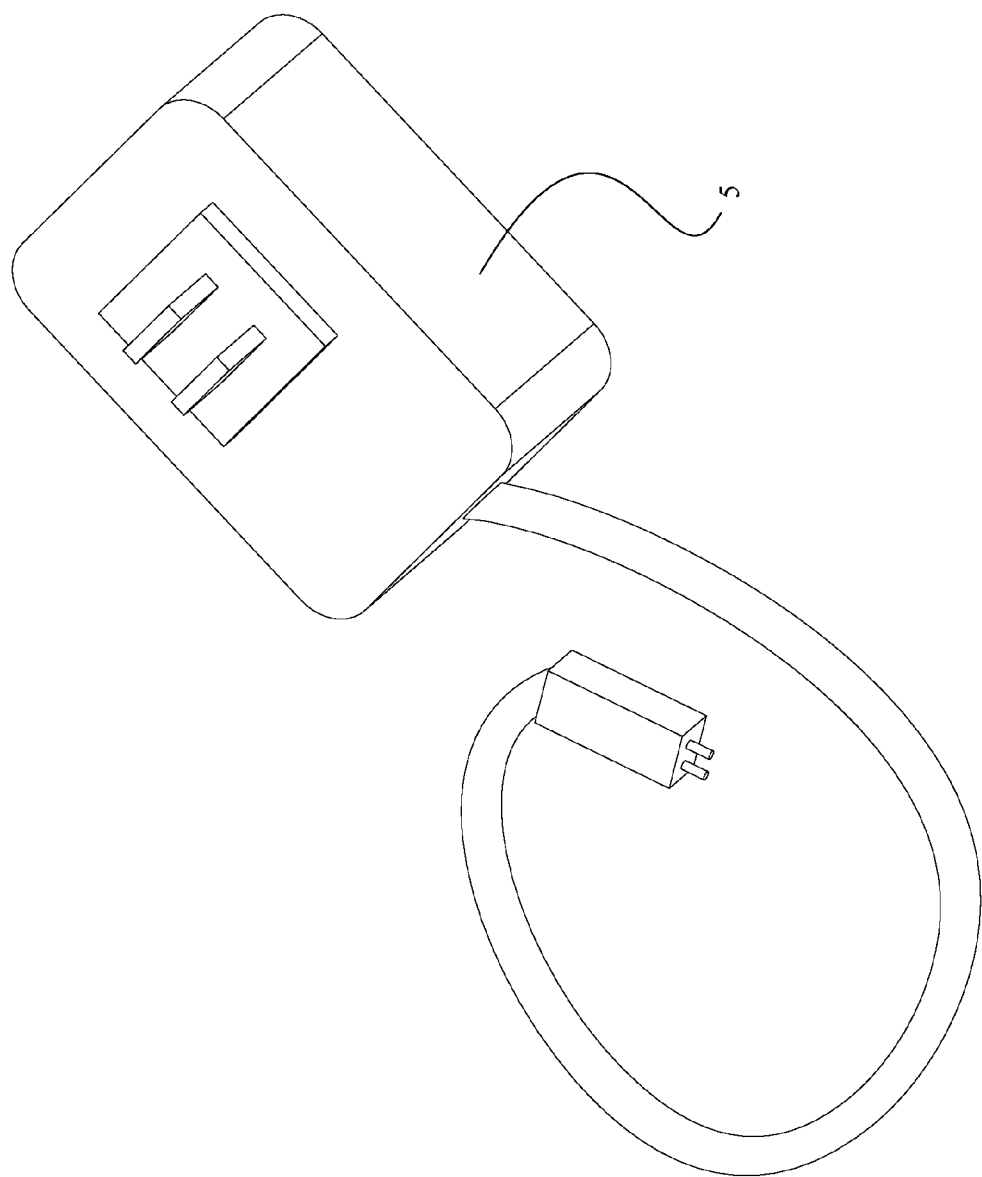
FIG. 26 is a perspective view of the power supply plug.

The at least two LED light strips 44, which function as the plurality of lighting devices, are oppositely connected to the lens holder 41 by at least four small double-back sponge adhesive pads. The at least two LED light strips 44 are positioned adjacent to the fresnel lens 42 so that the viewing area can be lighted by the at least two LED light strips 44. The dimensional relationship of the at least two LED light strips 44 to the surrounding structural walls are critical in order for maximizing light output and minimizing undesirable reflection on the cover top 13. The at least two LED light strips 44 only illuminate the reading area of the cover top 13, and the fresnel lens 42 is not affected by the illumination of the at least two LED light strips 44. When the light output is maximized, the users are able to clearly see the reading materials or other personal activities through the fresnel lens 42. Since the undesirable reflection is minimized, the light waves from the at least two light strips 44 don't travel through the fresnel lens 44. This allows a comfortable viewing area for the users' eyes so that the users are able to view reading materials or personal activities for an extended time period without exhausting their eyes. Each of the at least two LED light strips 44 has 24 individual LED bulbs to maximize the lighting output so that the at least two LED light strips 44 provides bright, uniform, and shadow-free illumination to the reading area. The new super-bright LED bulbs have an extensive usable life and probably never require replacement. The wire harness 45 is positioned within the lens holder 41 and electrically connected with the at least two LED light strips 44. The connection points in the wire harness 45 are covered by the harness cover 43 for added protection of the present invention. In reference to FIG. 26, the power supply plug 5 is electrically attached to the wire harness 45 so that the at least two LED light strips 44 can be illuminated. The present invention comprises a 12 volt DC (Direct Current) system that is safe and requires 50% less energy than standard fluorescent bulbs. The at least two LED light strips 44 can be powered form either household electricity or battery power. The power supply plug comprises a wire code, and the length of the wire code can be varied based upon users' preference and/or different embodiments of the present invention.

Figure 15:
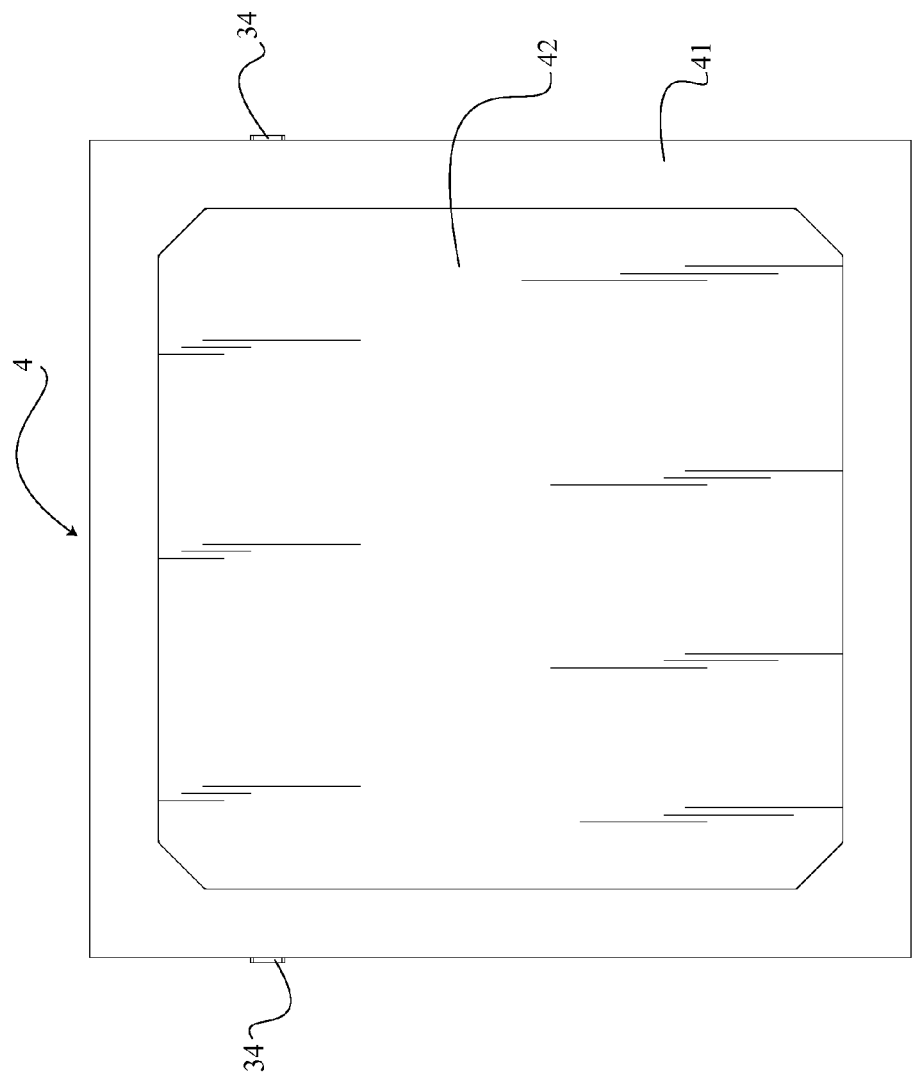
FIG. 15 is a top view of the upper section.
Figure 17:
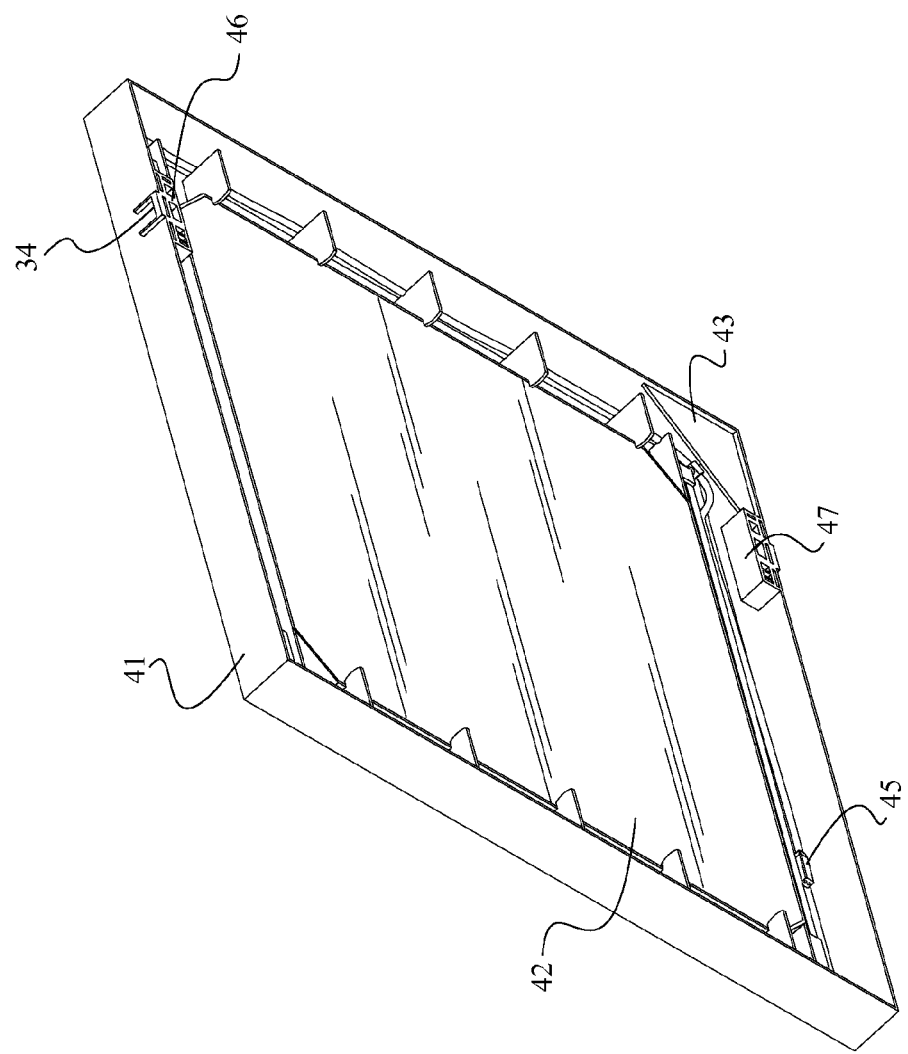
FIG. 17 is a back perspective view of the upper section.

In reference to FIG. 15 and FIG. 17, the left riser receptacle 46 is connected to the lens holder 41 from the left side, and the right riser receptacle 47 is connected to the lens holder 41 from the right side. The left riser receptacle 46 and the right riser receptacle 47 are positioned on the bottom side of the lens holder 41, and the left riser receptacle 46 and the right riser receptacle 47 each comprise one snap fit hook opening 34 from the outside surface. The left support arm 2 engages with the left riser receptacle 46 by the top locking system 31, and the right support arm 3 also engages with the right riser receptacle 47 by the top locking system 31 when the cantilever snap fit hook 33 in the top locking system 31 engages the snap fit hook opening 34 of left riser receptacle 46 and the right riser receptacle 47. The left support arm 2 and the right support arm 3 can be furnished at various heights to suit magnifying changes in the fresnel lens 42, such as 2× or 3×.

Figure 18:
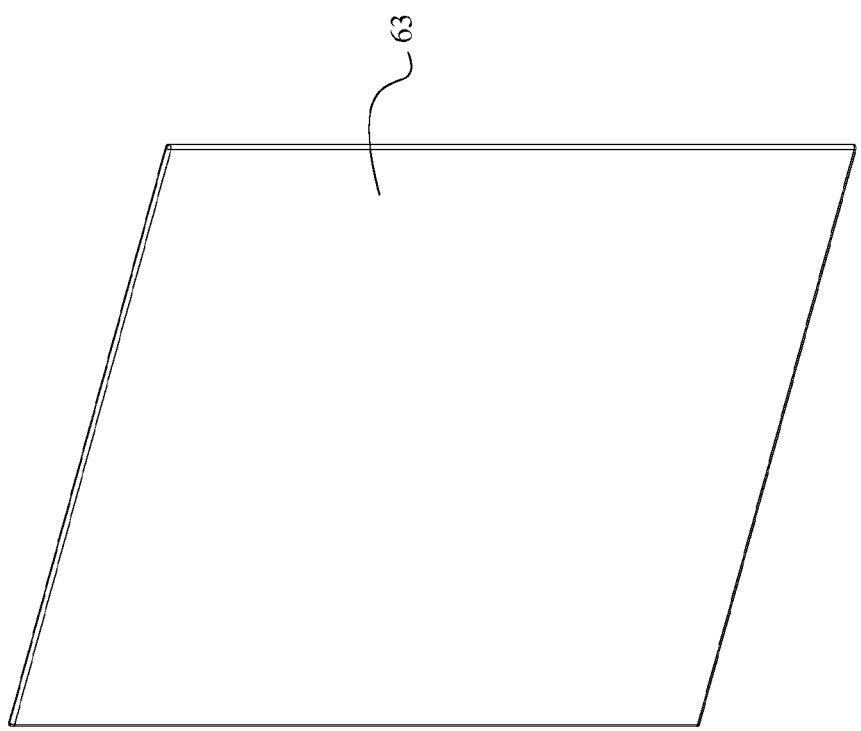
FIG. 18 is a perspective view of the minor.
Figure 19:
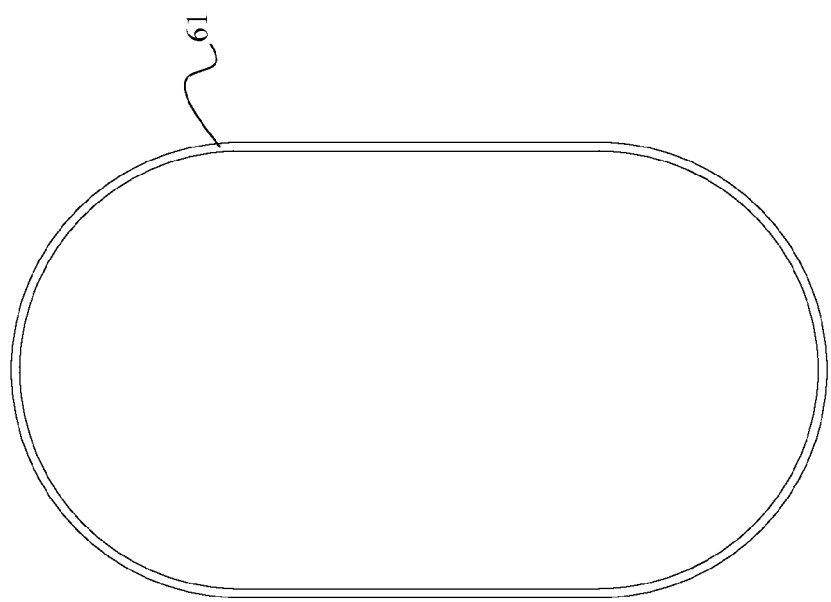
FIG. 19 is a front view of the first elastic band.
Figure 20:
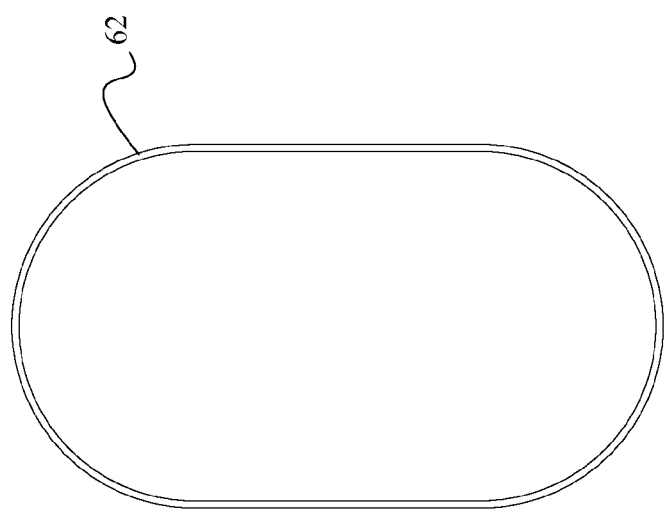
FIG. 20 is a front view of the second elastic band.
Figure 21:
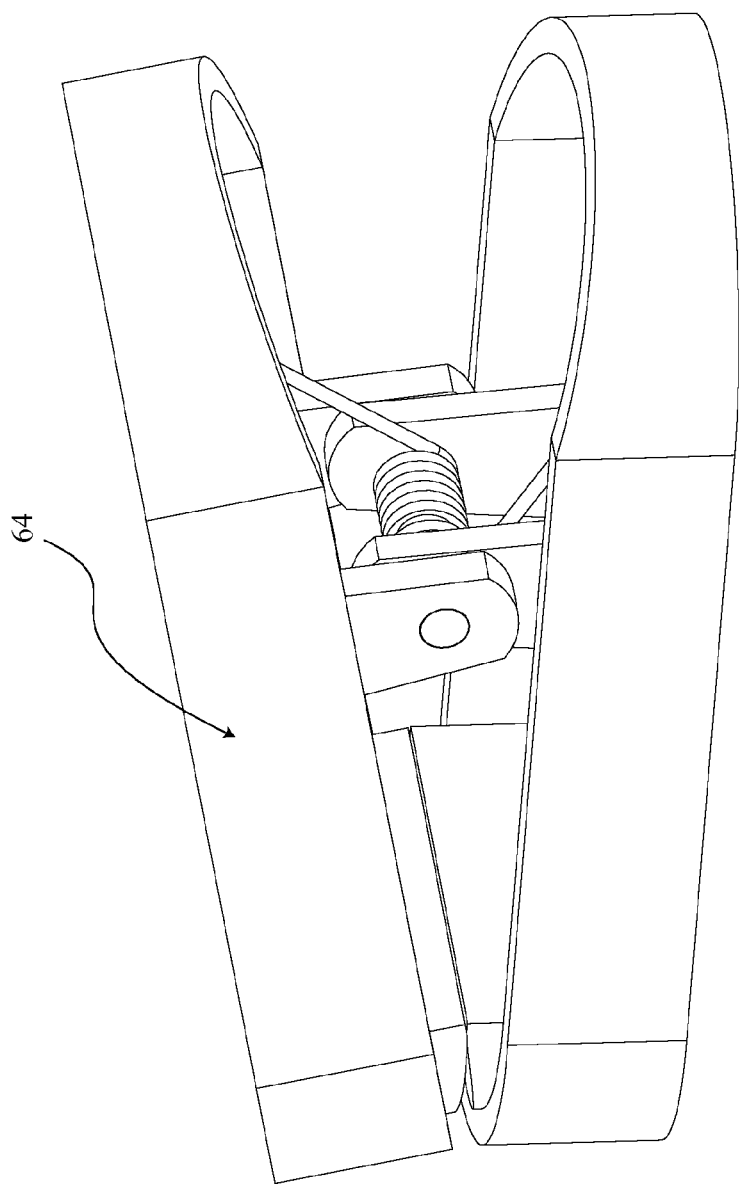
FIG. 21 is a perspective view of the page clamp.
Figure 27:
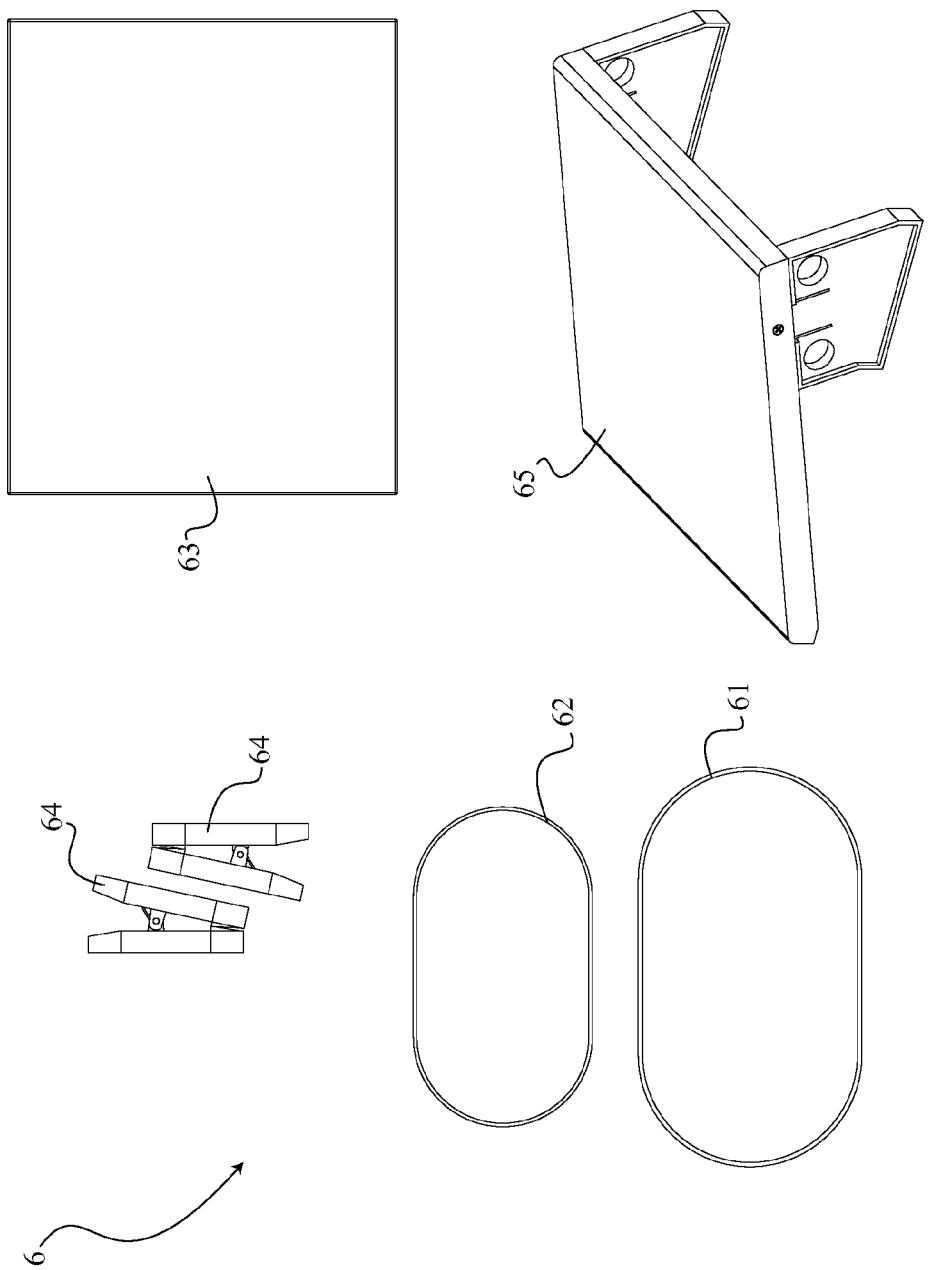
FIG. 27 is a view showing the plurality of accessories of the present invention.

In reference to FIG. 19, FIG. 20, and FIG. 27, the plurality of accessories 6 comprises a first elastic band 61, a second elastic band 62, a minor 63, at least two page clamps 64, and an incline stand 65. The size of the first elastic band 61 is larger than the second elastic band 62, and both elastic bands can be stored in the band compartment 159 when the first elastic band 61 and the second elastic band 62 are not used by the users. The user can use the first elastic band 61 and the second elastic band 62 to control pages in a book so that users don't have to hold the pages with their hands. In the preferred embodiment, the first elastic band 61 and the second elastic band 62 are made from latex-free ergonomically correct rubber so that the materials are safe for those people that may have allergy reactions to latex. The cover top 13 has a plurality of slots molded into the edges of the cover top so that the first elastic band 61 and/or the second elastic band 62 can be retained with the cover top 13 when needed. In reference to FIG. 21, the at least two page clamps 64 also used with the cover top 13 and the book as another method of holding pages. The at least two page clamps 64 are stored in the clip compartment 158 when the at least two page clamps 64 are not used by the users. The minor 63 is placed or attached on the cover top 13 so that users can use the mirror 63 for activities such as putting on makeup and combing hair. Because of the media rest 131, the mirror 63 doesn't slip or slide down the cover top 13 when the cover top 13 is positioned in the favorable reading angle. The user can personally observe magnified face or hair images while attending hands-free method for personal hygiene. In reference to FIG. 18, the minor 63 in the preferred embodiment is preferably made from a non-breakable plastic with removed sharp edges, although any desired material can also be used.

Figure 22:
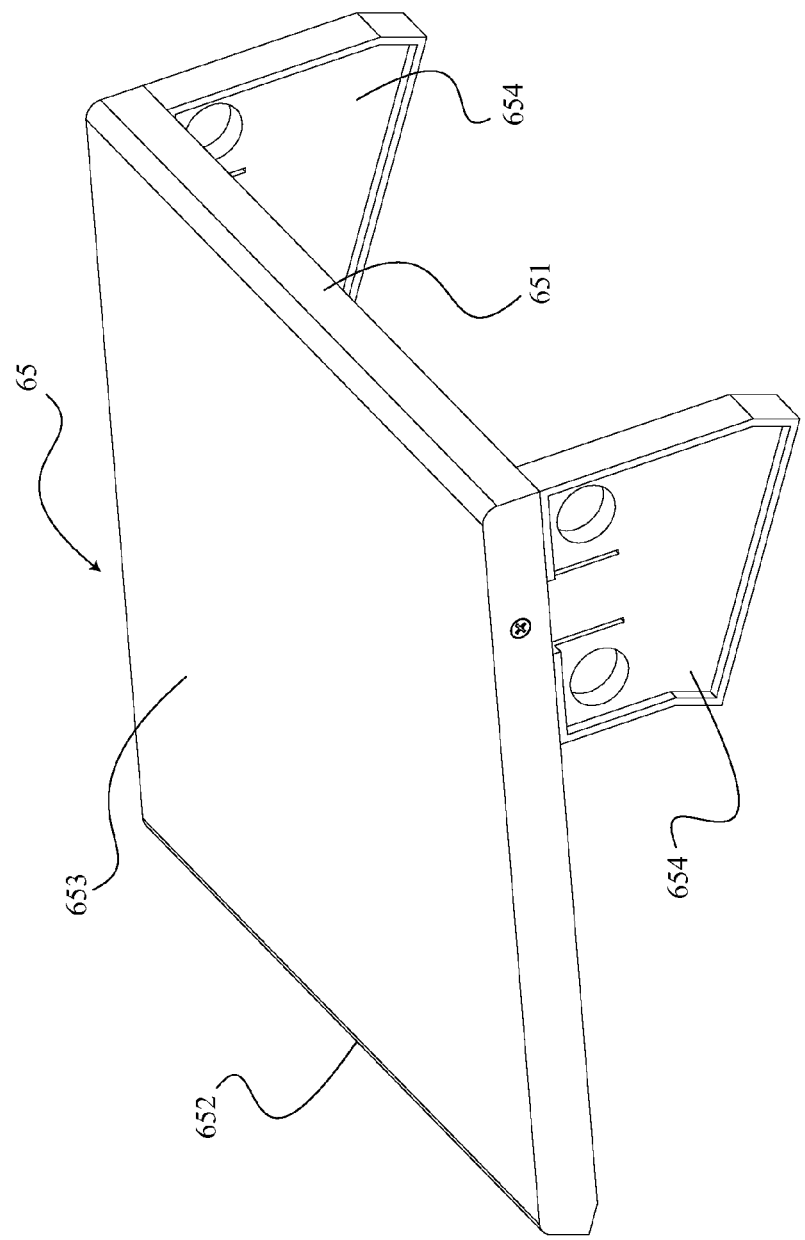
FIG. 22 is a top perspective view of the incline stand.
Figure 23:
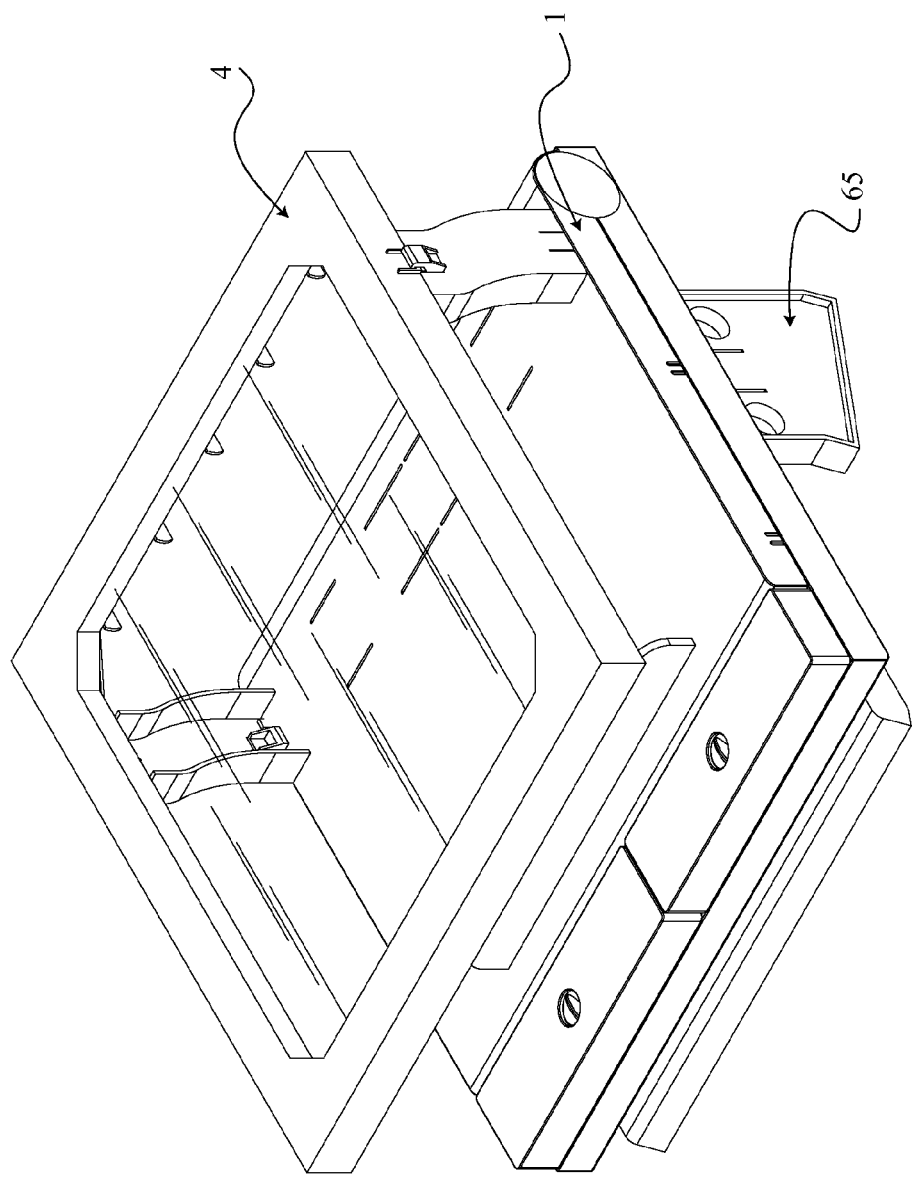
FIG. 23 is a perspective view of the present invention with the incline stand.
Figure 24:
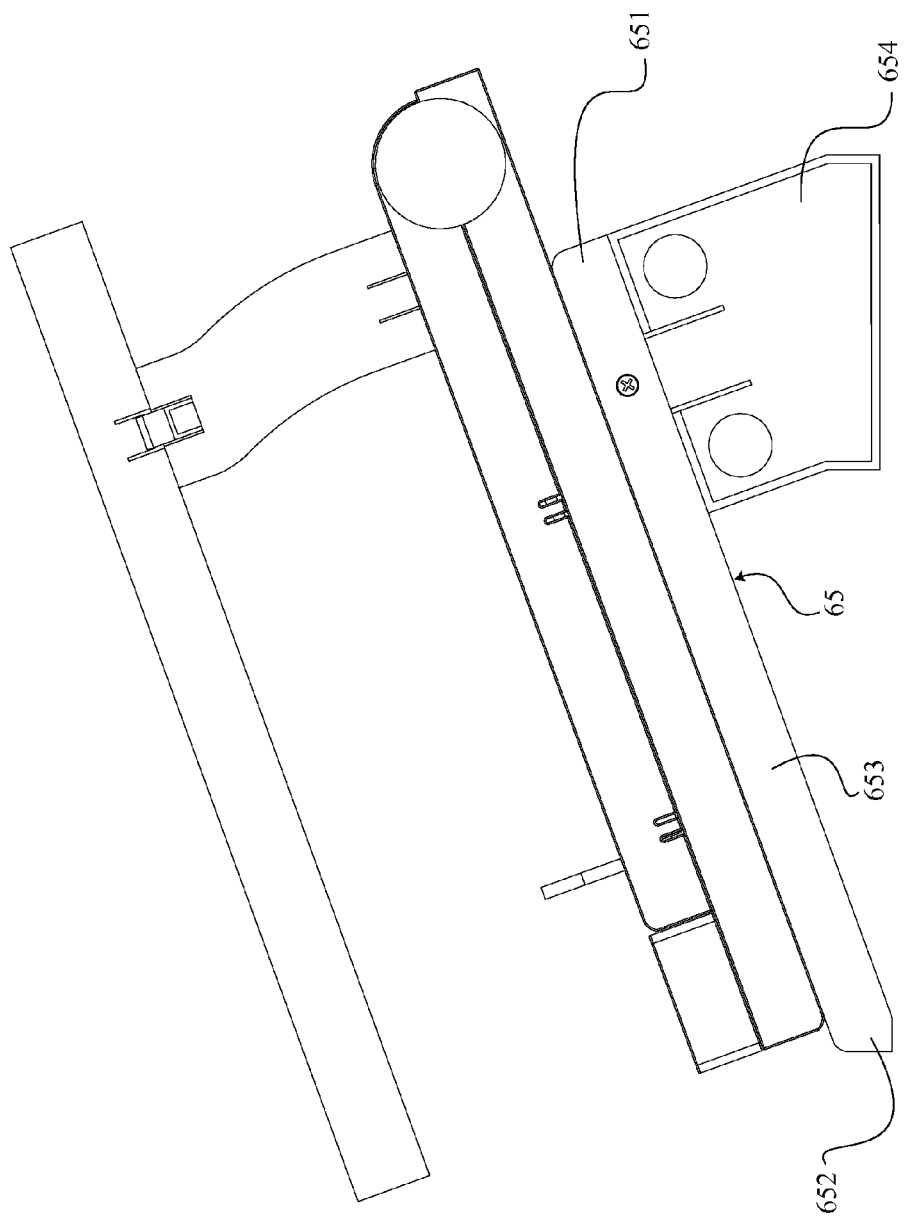
FIG. 24 is a left side view of the present invention with the incline stand.
Figure 25:
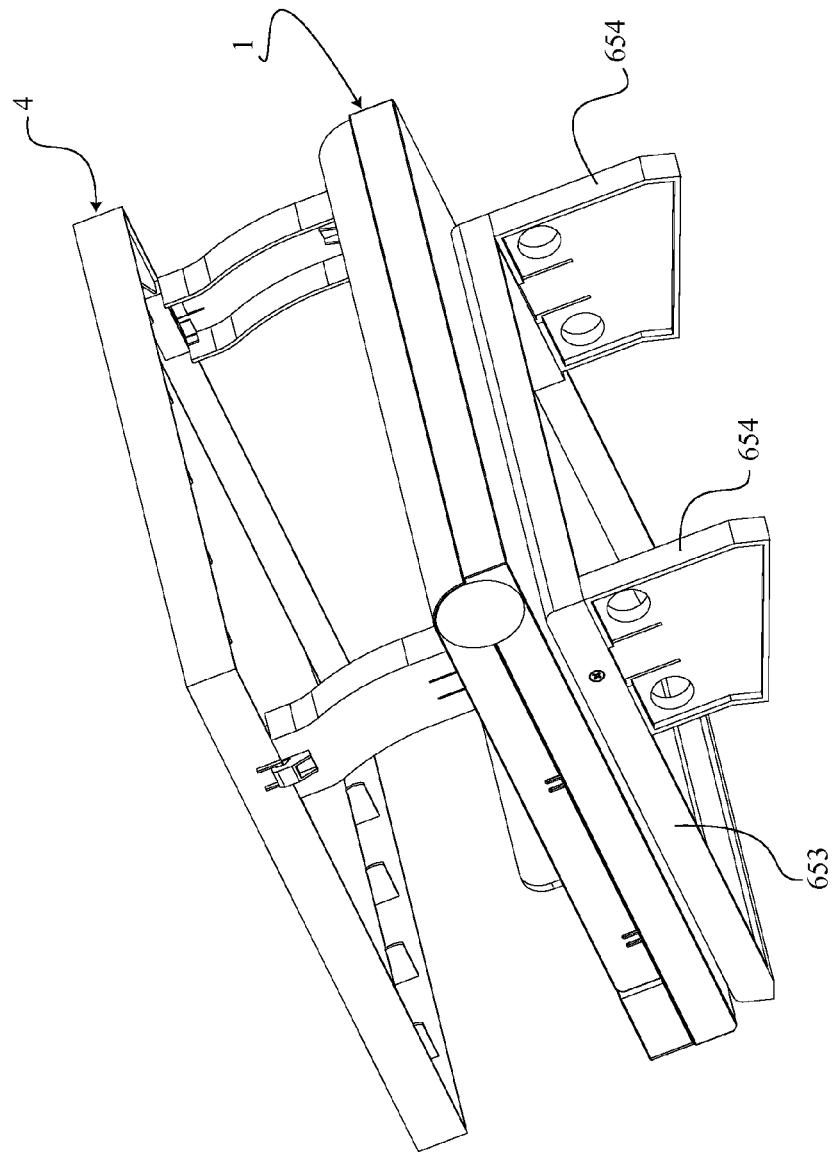
FIG. 25 is a front perspective view of the present invention with the incline stand.

Since the present invention changes its angles only from the back end 11, the incline stand 65 is introduced to the present invention so that the present invention can be angularly positioned from the front end 12. In reference to FIG. 22, the incline stand 65 comprises a higher edge 651, a lower edge 652, a platen 653, and at least two support legs 654. The at least two support legs 654 is perpendicularly connected to the platen 653 from the higher edge 651 by a pair of screws. In reference to FIG. 23, FIG. 24, and FIG. 25, when the users need to change the positioning angle of the present invention from the front end 12, the platen 653 is positioned under the bottom base panel 151 while placing the lower edge 652 adjacent with the front end 12. The incline stand 65 provides a horizontal to a 20 degree incline, in a position opposite from its normal position, and provides the user with a convenient surface for hand-writing notes or letters under the fresnel lens 42. This orientation can also be useful to the users in preparing their fingernails because the left support arm 2 and the right support arm 3 don't obstruct with the working area.

The present invention can also serve as a helpful assistant in the kitchen. Many cooks appreciate being able to read small prints in many recipes. The user can have the present invention placed on a kitchen counter for easy access. Hygienic care in the kitchen is easily provided by hand washing with soapy water and rinsing with hot water, and or flushed with rubbing alcohol. The present invention is relatively small with smooth edges and easy to clean surfaces, as opposed to similar products that are heavy, cumbersome, and awkward to use. The object of the design was to minimize production costs and provide a very functional product for users with limited means. Using the present invention for hand writing equally accommodates right or left handed users. In the preferred embodiment, all major structural components of the present invention are produced by plastic injection molding, and any type of plastic grade can be used as long as the appropriate materials meet the correct functionality and cost objectives.

Although the invention has been explained in relation to its preferred embodiment, it is to be understood that many other possible modifications and variations can be made without departing from the spirit and scope of the invention as hereinafter claimed.

What is claimed is:

1. An apparatus that allows a user to read a book or write without having to hold the book with a magnifying visible area comprising:
   a bottom section;
   a left support arm;
   a right support arm;
   an upper section;
   a power supply plug to be stored in a power plug compartment formed in the bottom section; and
   a plurality of accessories;
   the bottom section comprising a back end, a front end, a cover top, a web, a base pan, at least two hinge pins, a left storage cover, and a right storage cover;
   the left support arm and the right support arm each comprising a top locking system and a bottom locking system for firmly connecting the left and right support arms to the upper section and the bottom section, respectively;

the upper section comprising a lens holder, a fresnel lens, a harness cover, at least two light-emitting diode (LED) light strips, a wire harness, a left riser receptacle, and a right riser receptacle; and the plurality of accessories comprising a first elastic band, a second elastic band, a mirror, at least two page clamps, and an incline stand.

2. The apparatus that allows a user to read a book or write without having to hold the book with a magnifying visible area as claimed in claim 1, wherein:

the cover top is positioned above the base pan;

the at least two hinge pins are traversed into the cover top and the base pan from the back end;

the left storage cover and the right storage cover are positioned above the base pan from the front end;

the left support arm and the right support arm are positioned opposite to each other along the back end;

the left support arm and the right support arm are attached normal to the cover top by the bottom locking system;

the web is positioned in between the cover top and the base pan; and the web is movably connected to the cover top in between the back end and the front end.

3. The apparatus that allows a user to read a book or write without having to hold the book with a magnifying visible area as claimed in claim 2, wherein:

the base pan comprises a bottom base panel, at least two parallel ramps, a plurality of resilient rest pads, and a plurality of storage compartments;

the bottom base panel is positioned under the base pan;

the at least two parallel ramps are perpendicularly extended along the front end and the back end;

the at least two parallel ramps are centrally connected within the base pan;

the plurality of resilient rest pads is connected to the base panel from below;

the plurality of storage compartments is positioned within the base pan; and the incline stand is adjacently positioned with the bottom base panel.

4. The apparatus that allows a user to read a book or write without having to hold the book with a magnifying visible area as claimed in claim 3, wherein:

the web comprises at least two vertical rods, a top horizontal rod, and a bottom horizontal rod;

the at least two vertical rods are perpendicularly connected with the top horizontal rod and the bottom horizontal rod;

the top horizontal rod is movably connected to the cover top;

the at least two parallel ramps comprise at least five pairs of recesses;

the at least five pairs of recesses are positioned along the at least two parallel ramps; and the bottom horizontal rod is positioned within one of the at least five pairs of recesses.

5. The apparatus that allows a user to read a book or write without having to hold the book with a magnifying visible area as claimed in claim 3, wherein:

the plurality of storage compartments comprises a left compartment, a right compartment, a clip compartment, a band compartment, a support arm compartment, a power plug compartment, and additional compartments;

the left compartment and the right compartment are adjacently positioned on the front end;

the power plug compartment is positioned behind the left compartment and the right compartment;

the clip compartment is positioned behind the right compartment;

the support arm compartment is positioned behind the left compartment;

the band compartment is positioned in between the clip compartment and the support arm compartment;

the additional compartments are positioned behind the band compartment;

the left storage cover is positioned on the left compartment; and the right storage cover is positioned on the right compartment.

6. The apparatus that allows a user to read a book or write without having to hold the book with a magnifying visible area as claimed in claim 3, wherein:

the incline stand comprises a platen, at least two support legs, a higher edge, and a lower edge;

the at least two support legs are perpendicularly connected to the platen from the higher edge;

the lower edge is adjacently positioned below the left compartment and the right compartment; and the higher edge is adjacently positioned below the at least two hinge pins.

7. The apparatus that allows a user to read a book or write without having to hold the book with a magnifying visible area as claimed in claim 2, wherein:

the cover top comprises a media rest, a plurality of connection openings, left support recesses, and right support recesses;

the plurality of connection openings is positioned on the cover top and horizontally extended from left to right;

the media rest is traversed into the plurality of connection openings from above;

the left support recesses and the right support recesses are adjacently positioned with the at least two hinge pins;

the left support recesses and the right support recesses are oppositely positioned on the cover top;

the first elastic band and the second elastic band are positioned around the cover top;

the mirror is adjacently positioned atop the cover top; and the at least two page clamps are attached to the cover top.

8. The apparatus that allows a user to read a book or write without having to hold the book with a magnifying visible area as claimed in claim 1, wherein:

the fresnel lens is centrally connected to the lens holder;

the harness cover is positioned below the fresnel lens and connected within the lens holder;

the at least two LED light strips are oppositely positioned within the lens holder and adjacent to the fresnel lens;

the wire harness is positioned within the lens holder;

the left riser receptacle and the right riser receptacle are positioned within the lens holder from below;

the left riser receptacle is connected to the lens holder from the left side;

the right riser receptacle is connected to the lens holder from the right side;

the left support arm is attached to the left riser receptacle by the top locking system; and the right support arm is attached to the right riser receptacle by the top locking system.

9. The apparatus that allows a user to read a book or write without having to hold the book with a magnifying visible area as claimed in claim 8, wherein:

the wire harness is electrically connected with the at least two LED light strips; and the power supply plug is electrically attached to the wire harness.

10. The apparatus that allows a user to read a book or write without having to hold the book with a magnifying visible area as claimed in claim 1, wherein:
- the bottom locking system and the top locking system each comprise a cantilever snap fit hook and a snap fit hook opening;
- the cantilever snap fit hook of the bottom locking system is flexibly connected to the left support arm and the right support arm;
- the cantilever snap fit hook of the top locking system is flexibly connected to the left support arm and the right support arm opposite from the cantilever snap fit hook of the bottom locking system;
- the snap fit hook opening of the top locking system is adjacently positioned with the left riser receptacle and the right riser receptacle;
- the snap fit hook opening of the bottom locking system is positioned on the cover top; and
- the cantilever snap fit hook of the top locking system and the bottom locking system are respectively engaged with the snap fit hook opening of top locking system and the bottom locking system.

11. An apparatus that allows a user to read a book or write without having to hold the book with a magnifying visible area comprising:
- a bottom section;
- a left support arm;
- a right support arm;
- an upper section;
- a power supply plug to be stored in a power plug compartment formed in the bottom section; and
- a plurality of accessories;
- the bottom section comprising a back end, a front end, a cover top, a web, a base pan, at least two hinge pins, a left storage cover, and a right storage cover;
- the left support arm and the right support arm each comprising a top locking system and a bottom locking system;
- the upper section comprising a lens holder, a fresnel lens, a harness cover, at least two light-emitting diode (LED) light strips, a wire harness, a left riser receptacle, and a right riser receptacle;
- the bottom locking system and the top locking system each comprising a cantilever snap fit hook and a snap fit hook opening;
- the plurality of accessories comprising a first elastic band, a second elastic band, a mirror, at least two page clamps, and an incline stand; and
- the left support arm and the right support arm being positioned in between the bottom section and the upper section.

12. The apparatus that allows a user to read a book or write without having to hold the book with a magnifying visible area as claimed in claim 11, wherein:
- the cover top is positioned above the base pan;
- the at least two hinge pins are traversed into the cover top and the base pan from the back end;
- the left storage cover and the right storage cover are positioned above the base pan from the front end;
- the left support arm and the right support arm are positioned opposite to each other along the back end;
- the left support arm and the right support arm are attached normal to the cover top by the bottom locking system;
- the web is positioned in between the cover top and the base pan; and
- the web is movably connected to the cover top in between the back end and the front end.

13. The apparatus that allows a user to read a book or write without having to hold the book with a magnifying visible area as claimed in claim 12, wherein:
- the base pan comprises a bottom base panel, at least two parallel ramps, a plurality of resilient rest pads, and a plurality of storage compartments;
- the bottom base panel is positioned under the base pan;
- the at least two parallel ramps are perpendicularly extended along the front end and the back end;
- the at least two parallel ramps are centrally connected within the base pan;
- the plurality of resilient rest pads is connected to the base panel from below; and
- the plurality of storage compartments is positioned within the base pan; and
- the incline stand is adjacently positioned with the bottom base panel.

14. The apparatus that allows a user to read a book or write without having to hold the book with a magnifying visible area as claimed in claim 13, wherein:
- the web comprises at least two vertical rods, a top horizontal rod, and a bottom horizontal rod;
- the at least two vertical rods are perpendicularly connected with the top horizontal rod and the bottom horizontal rod;
- the top horizontal rod is movably connected to the cover top;
- the at least two parallel ramps comprise at least five pair of recesses;
- the at least five pairs of recesses are positioned along the at least two parallel ramps; and
- the bottom horizontal rod is positioned within one of the at least five pairs of recesses.

15. The apparatus that allows a user to read a book or write without having to hold the book with a magnifying visible area as claimed in claim 13, wherein:
- the plurality of storage compartments comprises a left compartment, a right compartment, a clip compartment, a band compartment, a support arm compartment, a power plug compartment, and additional compartments;
- the left compartment and the right compartment are adjacently positioned on the front end;
- the power plug compartment is positioned behind the left compartment and the right compartment;
- the clip compartment is positioned behind the right compartment;
- the support arm compartment is positioned behind the left compartment;
- the band compartment is positioned in between the clip compartment and the support arm compartment;
- the additional compartments are positioned behind the band compartment;
- the left storage cover is positioned on the left compartment; and
- the right storage cover is positioned on the right compartment.

16. The apparatus that allows a user to read a book or write without having to hold the book with a magnifying visible area as claimed in claim 12, wherein:
- the cover top comprises a media rest, a plurality of connection openings, left support recesses, and right support recesses;
- the plurality of connection openings is positioned on the cover top and horizontally extended from left to right;
- the media rest is traversed into the plurality of connection openings from above;

the left support recesses and the right support recesses are adjacently positioned with the at least two hinge pins;
the left support recesses and the right support recesses are oppositely positioned on the cover top;
the first elastic band and the second elastic band are positioned around the cover top;
the mirror is adjacently positioned atop the cover top; and
the at least two page clamps are attached to the cover top.

17. The apparatus that allows a user to read a book or write without having to hold the book with a magnifying visible area as claimed in claim 13, wherein:
the incline stand comprises a platen, at least two support legs, a higher edge, and a lower edge;
the at least two support legs are perpendicularly connected to the platen from the higher edge;
the lower edge is adjacently positioned below the left compartment and the right compartment; and
the higher edge is adjacently positioned below the at least two hinge pins.

18. The apparatus that allows a user to read a book or write without having to hold the book with a magnifying visible area as claimed in claim 11, wherein:
the fresnel lens is centrally connected to the lens holder;
the harness cover is positioned below the fresnel lens and connected within the lens holder;
the at least two LED light strips are oppositely positioned within the lens holder and adjacent to the fresnel lens;
the wire harness is positioned within the lens holder;
the left riser receptacle and the right riser receptacle are positioned within the lens holder from below;
the left riser receptacle is connected to the lens holder from the left side;
the right riser receptacle is connected to the lens holder from the right side;
the left support arm is attached to the left riser receptacle by the top locking system;
the right support arm is attached to the right riser receptacle by the top locking system;
the wire harness is electrically connected with the at least two LED light strips; and
the power supply plug is electrically attached to the wire harness.

19. The apparatus that allows a user to read a book or write without having to hold the book with a magnifying visible area as claimed in claim 11, wherein:
the cantilever snap fit hook of the bottom locking system is flexibly connected to the left support arm and the right support arm;
the cantilever snap fit hook of the top locking system is flexibly connected to the left support arm and the right support arm opposite from the cantilever snap fit hook of the bottom locking system;
the snap fit hook opening of the top locking system is adjacently positioned with the left riser receptacle and the right riser receptacle;
the snap fit hook opening of the bottom locking system is positioned on the cover top; and
the cantilever snap fit hook of the top locking system and the bottom locking system are respectively engaged with the snap fit hook opening of top locking system and the bottom locking system.

\* \* \* \* \*